United States Patent
Kaehler et al.

(10) Patent No.: US 10,922,583 B2
(45) Date of Patent: Feb. 16, 2021

(54) TRAINING A NEURAL NETWORK WITH REPRESENTATIONS OF USER INTERFACE DEVICES

(71) Applicant: Magic Leap, Inc., Plantation, FL (US)

(72) Inventors: Adrian Kaehler, Los Angeles, CA (US); Gary R. Bradski, Palo Alto, CA (US); Vijay Badrinarayanan, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/994,599

(22) Filed: May 31, 2018

(65) Prior Publication Data
US 2019/0034765 A1    Jan. 31, 2019

Related U.S. Application Data

(60) Provisional application No. 62/537,311, filed on Jul. 26, 2017.

(51) Int. Cl.
*G06K 9/62* (2006.01)
*G06N 3/04* (2006.01)
(Continued)

(52) U.S. Cl.
CPC ............ *G06K 9/6257* (2013.01); *G06F 3/011* (2013.01); *G06F 3/017* (2013.01); *G06F 3/0346* (2013.01);
(Continued)

(58) Field of Classification Search
CPC ... G06F 3/011; G06F 3/04815; G06N 3/0445; G06N 3/0454; G06N 3/08; G06T 19/006;
(Continued)

(56) References Cited

U.S. PATENT DOCUMENTS 5,291,560 A    3/1994   Daugman
5,583,795 A   12/1996   Smyth
(Continued)

FOREIGN PATENT DOCUMENTS

WO    WO 2014/182769    11/2014
WO    WO 2015/164807    10/2015
(Continued)

OTHER PUBLICATIONS

Yuan, Miaolong & Ong, S K & Nee, Andrew. (2004). Assembly Guidance in Augmented Reality Environments Using a Virtual Interactive Tool. (Year: 2004).*
(Continued)

*Primary Examiner* — Antonio A Caschera
(74) *Attorney, Agent, or Firm* — Knobbe, Martens, Olson & Bear, LLP

(57) ABSTRACT

An example wearable display system is capable of determining a user interface (UI) event with respect to a virtual UI device (e.g., a button) and a pointer (e.g., a finger or a stylus) using a neural network. The wearable display system can render a representation of the UI device onto an image of the pointer captured when the virtual UI device is shown to the user and the user uses the pointer to interact with the virtual UI device. The representation of the UI device can include concentric shapes (or shapes with similar or the same centers of gravity) of high contrast. The neural network can be trained using training images with representations of virtual UI devices and pointers.

20 Claims, 15 Drawing Sheets

(51) Int. Cl.
| | |
|---|---|
| *G06N 3/10* | (2006.01) |
| *G06K 9/00* | (2006.01) |
| *G06F 3/01* | (2006.01) |
| *G06T 7/70* | (2017.01) |
| *G06F 3/0346* | (2013.01) |
| *G06F 3/0481* | (2013.01) |
| *G06N 3/08* | (2006.01) |
| *G06T 19/00* | (2011.01) |
| *G06K 9/46* | (2006.01) |
| *G06N 7/00* | (2006.01) |
| *G06N 5/02* | (2006.01) |
| *G06N 5/00* | (2006.01) |

(52) U.S. Cl.
CPC .......... *G06F 3/04815* (2013.01); *G06K 9/00* (2013.01); *G06K 9/00355* (2013.01); *G06K 9/00664* (2013.01); *G06K 9/00671* (2013.01); *G06N 3/0445* (2013.01); *G06N 3/0454* (2013.01); *G06N 3/0481* (2013.01); *G06N 3/08* (2013.01); *G06N 3/105* (2013.01); *G06T 7/70* (2017.01); *G06T 19/006* (2013.01); *G06F 2203/04804* (2013.01); *G06F 2203/04807* (2013.01); *G06K 9/4628* (2013.01); *G06N 3/0472* (2013.01); *G06N 5/003* (2013.01); *G06N 5/025* (2013.01); *G06N 7/005* (2013.01); *G06T 2207/10012* (2013.01); *G06T 2207/20081* (2013.01); *G06T 2207/20084* (2013.01)

(58) Field of Classification Search
CPC .......... G06T 2207/20081; G06T 2207/20084; G06K 9/62
See application file for complete search history.

(56) References Cited

U.S. PATENT DOCUMENTS

| | | | |
|---|---|---|---|
| 6,850,221 | B1 | 2/2005 | Tickle |
| D514,570 | S | 2/2006 | Ohta |
| 7,771,049 | B2 | 8/2010 | Knaan et al. |
| 7,970,179 | B2 | 6/2011 | Tosa |
| 8,098,891 | B2 | 1/2012 | Lv et al. |
| 8,341,100 | B2 | 12/2012 | Miller et al. |
| 8,345,984 | B2 | 1/2013 | Ji et al. |
| 8,363,783 | B2 | 1/2013 | Gertner et al. |
| 8,845,625 | B2 | 9/2014 | Angeley et al. |
| 8,950,867 | B2 | 2/2015 | Macnamara |
| 9,081,426 | B2 | 7/2015 | Armstrong |
| 9,141,916 | B1 | 9/2015 | Corrado et al. |
| 9,215,293 | B2 | 12/2015 | Miller |
| 9,262,680 | B2 | 2/2016 | Nakazawa et al. |
| D752,529 | S | 3/2016 | Loretan et al. |
| 9,310,559 | B2 | 4/2016 | Macnamara |
| 9,348,143 | B2 | 5/2016 | Gao et al. |
| D758,367 | S | 6/2016 | Natsume |
| D759,657 | S | 7/2016 | Kujawski et al. |
| 9,417,452 | B2 | 8/2016 | Schowengerdt et al. |
| 9,430,829 | B2 | 8/2016 | Madabhushi et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,720,505 | B2 * | 8/2017 | Gribetz ............ G02B 27/017 |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 2002/0041327 | A1 | 4/2002 | Hildreth et al. |
| 2004/0130680 | A1 | 7/2004 | Zhou et al. |
| 2006/0088193 | A1 | 4/2006 | Muller et al. |
| 2006/0147094 | A1 | 7/2006 | Yoo |
| 2007/0140531 | A1 | 6/2007 | Hamza |
| 2009/0195538 | A1 | 8/2009 | Ryu et al. |
| 2011/0182469 | A1 | 7/2011 | Ji et al. |
| 2012/0119888 | A1 | 5/2012 | Reeves et al. |
| 2012/0127062 | A1 | 5/2012 | Bar-Zeev et al. |
| 2012/0163678 | A1 | 6/2012 | Du et al. |
| 2013/0082922 | A1 | 4/2013 | Miller |
| 2013/0104085 | A1 | 4/2013 | Mlyniec et al. |
| 2013/0117377 | A1 | 5/2013 | Miller |
| 2013/0125027 | A1 | 5/2013 | Abovitz |
| 2013/0147686 | A1 | 6/2013 | Clavin et al. |
| 2014/0049558 | A1 | 2/2014 | Krauss et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0270405 | A1 | 9/2014 | Derakhshani et al. |
| 2014/0279774 | A1 | 9/2014 | Wang et al. |
| 2014/0306866 | A1 | 10/2014 | Miller et al. |
| 2014/0380249 | A1 | 12/2014 | Fleizach |
| 2015/0016777 | A1 | 1/2015 | Abovitz et al. |
| 2015/0103306 | A1 | 4/2015 | Kaji et al. |
| 2015/0117760 | A1 | 4/2015 | Wang et al. |
| 2015/0125049 | A1 | 5/2015 | Taigman et al. |
| 2015/0134583 | A1 | 5/2015 | Tamatsu et al. |
| 2015/0170002 | A1 | 6/2015 | Szegedy et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0278642 | A1 | 10/2015 | Chertok et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0338915 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0018985 | A1 | 1/2016 | Bennet et al. |
| 2016/0026253 | A1 | 1/2016 | Bradski et al. |
| 2016/0034811 | A1 | 2/2016 | Paulik et al. |
| 2016/0035078 | A1 | 2/2016 | Lin et al. |
| 2016/0098844 | A1 | 4/2016 | Shaji et al. |
| 2016/0104053 | A1 | 4/2016 | Yin et al. |
| 2016/0104056 | A1 | 4/2016 | He et al. |
| 2016/0135675 | A1 | 5/2016 | Du et al. |
| 2016/0162782 | A1 | 6/2016 | Park |
| 2016/0165170 | A1 | 6/2016 | McRae |
| 2016/0299685 | A1 | 10/2016 | Zhai et al. |
| 2016/0313902 | A1 | 10/2016 | Hill et al. |
| 2017/0053165 | A1 | 2/2017 | Kaehler |
| 2017/0168566 | A1 | 6/2017 | Osterhout et al. |
| 2018/0018451 | A1 | 1/2018 | Spizhevoy et al. |
| 2018/0018515 | A1 | 1/2018 | Spizhevoy et al. |
| 2018/0089834 | A1 | 3/2018 | Spizhevoy et al. |
| 2018/0096226 | A1 | 4/2018 | Aliabadi et al. |
| 2018/0137642 | A1 | 5/2018 | Malisiewicz |
| 2018/0157398 | A1 | 6/2018 | Kaehler et al. |

FOREIGN PATENT DOCUMENTS

| | | |
|---|---|---|
| WO | WO 2018/013199 | 1/2018 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/093796 | 5/2018 |
| WO | WO 2018/106542 | 6/2018 |
| WO | WO 2019/022849 | 1/2019 |

OTHER PUBLICATIONS

Gupta, Satyandra K. Training in Virtual Environments: A Safe, Cost-Effective, and Engaging Approach to Training. College Park, Md: CALCE, EPSC Press, University of Maryland, (2008). (Year: 2008).*

(56) References Cited

OTHER PUBLICATIONS

"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.
"Camera calibration with OpenCV", OpenCV, retrieved May 5, 2016, in 12 pages. URL: http://docs.opencv.org/2.4/doc/tutorials/calib3d/camera_calibration/camera_calibration.html.
"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Convolution", Wikipedia, accessed Oct. 1, 2017, in 17 pages. URL: https://en.wikipedia.org/wiki/Convolution.
"Deep Learning", Wikipedia, printed Oct. 3, 2017, in 23 pages. URL: https://en.wikipedia.org/wiki/Deep_learning.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
"Transfer Function Layers", GitHub, Dec. 1, 2015, in 13 pages; accessed URL: http://github.com/torch/nn/blob/master/doc/transfer.md.
Adegoke et al., "Iris Segmentation: A Survey", Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
Aubry M. et al., "Seeing 3D chairs: e emplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.
Badrinarayanan et al., "SegNet: A Deep Convolutional Encoder-Decoder Architecture for Image Segmentation", TPAMI, vol. 39, No. 12, Dec. 2017.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.
Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.
Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.
Biederman I., "Recognition-by-Components: A Theory of Human Image Understanding", Psychol Rev. (Apr. 1987) 94(2): 115-147.
Bouget, J., "Camera Calibration Toolbox for Matlab" Cal-Tech, Dec. 2, 2013, in 5 pages. URL: https://www.vision.caltech.edu/bouguetj/calib_doc/index.html#parameters.
Bulat A. et al., "Human pose estimation via Convolutional Part Heatmap Regression", arXiv e-print arXiv:1609.01743v1, Sep. 6, 2016 in 16 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chatfield et al., "Return of the Devil in the Details: Delving Deep into Convolutional Nets", arXiv eprint arXiv:1405.3531v4, Nov. 5, 2014 in 11 pages.

Chen et al., "Semantic Image Segmentation With Deep Convolutional Nets and Fully Connected CRFs," In ICLR, arXiv:1412.7062v3 [cs.CV] Apr. 9, 2015.
Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-object-class-detection.pdf>; 11 pages.
Choy et al., "3D-R2N2: A Unified Approach for Single and Multi-view 3D Object Reconstruction", arXiv; eprint arXiv:1604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Coughlan et al., "The Manhattan World Assumption: Regularities in scene statistics which enable bayesian inference," In NIPS, 2000.
Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.
Dasgupta et al., "Delay: Robust Spatial Layout Estimation for Cluttered Indoor Scenes," In CVPR, 2016.
Daugman, J. et al., "Epigenetic randomness, complexity and singularity of human iris patterns", Proceedings of Royal Society: Biological Sciences, vol. 268, Aug. 22, 2001, in 4 pages.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Del Pero et al., "Bayesian geometric modeling of indoor scenes," In CVPR, 2012.
Del Pero et al., "Understanding bayesian rooms using composite 3d object models," In CVPR, 2013.
Detone D. et al., "Deep Image Homography Estimation", arXiv eprint arXiv:1606.03798v1, Jun. 13, 2016 in 6 pages.
Dwibedi et al., "Deep Cuboid Detection: Beyond 2D Bounding Boxes", arXiv eprint arXiv:1611.10010v1; Nov. 30, 2016 in 11 pages.
Everingham M. et al., "The PASCAL Visual Object Classes (VOC) Challenge", Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; Dec. 17, 2011 in 9 pages.
Gidaris S. et al., "Object detection via a multi-region & semantic segmentation-aware CNN model", in Proceedings of the IEEE International Conference on Computer Vision; Dec. 7-13, 2015 (pp. 1134-1142).

(56) References Cited

OTHER PUBLICATIONS

Girshick R. et al., "Fast R-CNN", Proceedings of the IEEE International Conference on Computer Vision; Dec. 7-13, 2015 (pp. 1440-1448).

Girshick R. et al., "Rich feature hierarchies for accurate object detection and semantic segmentation", Proceedings of the IEEE Conference on Computer Vision and Pattern Recognition, Jun. 23-28, 2014 (pp. 580-587).

Gupta A. et al., "Blocks World Revisited: Image Understanding Using Qualitative Geometry and Mechanics", in European Conference on Computer Vision; Sep. 5, 2010 in 14 pages.

Gupta A. et al., "From 3D Scene Geometry to Human Workspace", in Computer Vision and Pattern Recognition (CVPR); IEEE Conference on Jun. 20-25, 2011 (pp. 1961-1968).

Gupta et al., "Perceptual Organization and Recognition of Indoor Scenes from RGB-D Images," In CVPR, 2013.

Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).

Gupta S. et al., "Inferring 3D Object Pose in RGB-D Images", arXiv e-print arXiv:1502.04652v1, Feb. 16, 2015 in 13 pages.

Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.

Han et al., "Deep Compression: Compressing Deep Neural Networks with Pruning, Trained Quantization and Huffman Coding", arXiv eprint arXiv:1510.00149v5, Feb. 15, 2016 in 14 pages.

Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.

Hartley R. et al., *Multiple View Geometry in Computer Vision*, 2nd Edition; Cambridge University Press, (Apr. 2004); in 673 pages.

He et al., "Deep Residual Learning for Image Recognition," In CVPR, 2016.

He et al., "Delving Deep into Rectifiers: Surpassing Human-level Performance on ImageNet Classification", arXiv: eprint arXiv:1502.01852v1, Feb. 6, 2015 in 11 pages.

He et al., "Spatial Pyramid Pooling in Deep Convolutional Networks for Visual Recognition", arXiv eprint arXiv:1406.4729v2; Aug. 29, 2014 in 14 pages.

Hedau et al., "Recovering the Spatial Layout of Cluttered Rooms," In ICCV, 2009.

Hedau V. et al., "Recovering Free Space of Indoor Scenes from a Single Image", in *Computer Vision and Pattern Recognition* (CVPR), IEEE Conference Jun. 16-21, 2012 (pp. 2807-2814).

Hejrati et al., "Categorizing Cubes: Revisiting Pose Normalization", Applications of Computer Vision (WACV), 2016 IEEE Winter Conference, Mar. 7-10, 2016 in 9 pages.

Hijazi, S. et al., "Using Convolutional Neural Networks for Image Recognition", Tech Rep. (Sep. 2015) available online URL: http://ip.cadence.com/uploads/901/cnn-wp-pdf, in 12 pages.

Hochreiter et al., "Long Short-Term Memory," Neural computation, 9, 1735-1780, 1997.

Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.

Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.

Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).

Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.

Iandola F. et al., "SqueezeNet: AlexNet-level accuracy with 50x fewer parameters and <1MB model size", arXiv eprint arXiv:1602.07360v1, Feb. 24, 2016 in 5 pages.

Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.

Izadinia et al., "IM2CAD," arXiv preprint arXiv:1608.05137, 2016.

Jarrett et al., "What is the Best Multi-Stage Architecture for Object Recognition?", In Computer Vision IEEE 12th International Conference Sep. 29-Oct. 2, 2009, pp. 2146-2153.

Ji, H. et al., "3D Convolutional Neural Networks for Human Action Recognition", IEEE Transactions on Pattern Analysis and Machine Intelligence, vol. 35:1, Jan. 2013, in 11 pages.

Jia et al., "3D-Based Reasoning with Blocks, Support, and Stability", Proceedings of the IEEE Conference on Computer Vision and Pattern Recognition; Jun. 23-28, 2013 in 8 pages.

Jia et al', "Caffe: Convolutional Architecture for Fast Feature Embedding", arXiv e-print arXiv:1408.5093v1, Jun. 20, 2014 in 4 pages.

Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).

Jillela et al., "An Evaluation of Iris Segmentation Algorithms in Challenging Periocular Images", Handbook of Iris Recognition, Springer Verlag, Heidelberg (Jan. 12, 2013) in 28 pages.

Kar A. et al., "Category-specific object reconstruction from a single image", in *Proceedings of the IEEE Conference on Computer Vision and Pattern Recognition*. Jun. 7-12, 2015 (pp. 1966-1974).

Krizhevsky et al., "ImageNet Classification with Deep Convolutional Neural Networks", Advances in Neural Information Processing Systems. Apr. 25, 2013, pp. 1097-1105.

Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.

Lee D. et al., "Geometric Reasoning for Single Image Structure Recovery", in IEEE Conference Proceedings in Computer Vision and Pattern Recognition (CVPR) Jun. 20-25, 2009, pp. 2136-2143.

Lee et al., "Deeply-Supervised Nets," In AISTATS, San Diego, CA 2015, JMLR: W&CP vol. 38.

Lee et al., "Estimating Spatial Layout of Rooms using Volumetric Reasoning about Objects and Surfaces," In NIPS, 2010.

Lee et al., "Generalizing Pooling Functions in Convolutional Neural Networks: Mixed, Gated, and Tree," In AISTATS, Gadiz, Spain, JMLR: W&CP vol. 51, 2016.

Lee et al., "Recursive Recurrent Nets with Attention Modeling for OCR in the Wild," In CVPR, 2016.

Liang et al., "Recurrent Convolutional Neural Network for Object Recognition," In CVPR, 2015.

Lim J. et al., "FPM: Fine pose Parts-based Model with 3D CAD models", European Conference on Computer Vision; Springer Publishing, Sep. 6, 2014, pp. 478-493.

Liu et al., "ParseNet: Looking Wider to See Better", arXiv eprint arXiv:1506.04579v1; Jun. 15, 2015 in 9 pages.

Liu et al., "Rent3d: Floor-Plan Priors for Monocular Layout Estimation," In CVPR, 2015.

Liu W. et al., "SSD: Single Shot MultiBox Detector", arXiv e-print arXiv:1512.02325v5, Dec. 29, 2016 in 17 pages.

Long et al., "Fully Convolutional Networks for Semantic Segmentation", Proceedings of the IEEE Conference on Computer Vision and Pattern Recognition (Jun. 7-12, 2015) in 10 pages.

Mallya et al., "Learning Informative Edge Maps for Indoor Scene Layout Prediction," In ICCV, 2015.

Meet singleue, "remoteless control for your living room," downloaded from https://singlecue.com on Oct. 28, 2017, in 7 pages.

Mirowski et al., "Learning to Navigate in Complex Environments," In ICLR, 2017.

Nair et al., "Rectified Linear Units Improve Restricted Boltzmann Machines," In ICML, Haifa, Israel 2010.

Newell et al., "Stacked Hourglass Networks for Human Pose Estimation," In ECCV, ArXiv:1603.06937v2 [cs.CV] 2016.

(56) References Cited

OTHER PUBLICATIONS

Noh et al., "Learning Deconvolution Network for Semantic Segmentation," In ICCV, 2015.
Oberweger et al., "Training a Feedback Loop for Hand Pose Estimation," In ICCV, 2015.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Peng et al., "A Recurrent Encoder-Decoder Network for Sequential Face Alignment," In ECCV, arXiv:1608.05477v2 [cs.CV] 2016.
Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren et al., "A Coarse-to-Fine Indoor Layout Estimation (CFILE) Method," In ACCV, arXiv:1607.00598v1 [cs.CV] 2016.
Ren S. et al., "Faster R-CNN: Towards real-time object detection with region proposal networks", arXiv eprint arXiv:1506.01497v3; Jan. 6, 2016 in 14 pages.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Russell et al., "Labelme: a database and web-based tool for image annotation," IJCV, vol. 77, Issue 1-3, pp. 157-173, May 2008.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Schwing et al., "Efficient Structured Prediction for 3D Indoor Scene Understanding," In CVPR, 2012.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Shi et al., "Convolutional LSTM Network: A Machine Learning Approach for Precipitation Nowcasting," In NIPS, 2015.
Simonyan K. et al., "Very deep convolutional networks for large-scale image recognition", arXiv eprint arXiv:1409.1556v6, Apr. 10, 2015 in 14 pages.
Song S. et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song S. et al., "Sliding Shapes for 3D Object Detection in Depth Images", in European Conference on Computer Vision, (Sep. 6, 2014) Springer Publishing (pp. 634-651).
Song et al., "Sun RGB-D: A RGB-D Scene Understanding Benchmark Suite," In CVPR, 2015.
Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Going Deeper with Convolutions," In CVPR, 2015 in 9 pages.
Szegedy et al., "Rethinking the Inception Architecture for Computer Vision", arXiv eprint arXIV:1512.00567v3, Dec. 12, 2015 in 10 pages.
Tompson et al., "Joint Training of a Convolutional Network and a Graphical Model for Human Pose Estimation," In NIPS, 2014.
Tu et al., "Auto-context and Its Application to High-level Vision Tasks," In CVPR, 2008. 978-1-4244-2243-2/08, IEEE.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single Image 3D Interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Xiao et al., "Reconstructing the Worlds Museums," IJCV, 2014.
Xiao et al., "Sun database: Large-scale scene recognition from abbey to zoo," In CVPR, 2010 IEEE Conference on 2010, 3485-3492.
Yang Y. et al., "Articulated human detection with flexible mixtures of parts", IEEE Transactions on Pattern Analysis and Machine Intelligence. Dec. 2013; 35(12):2878-90.
Zhang et al., "Estimating the 3D Layout of Indoor Scenes and its Clutter from Depth Sensors," In ICCV, 2013.
Zhang et al., Large-scale Scene Understanding Challenge: Room Layout Estimation, 2016.
Zhao et al., "Scene Parsing by Integrating Function, Geometry and Appearance Models," In CVPR, 2013.
Zheng et al., "Conditional Random Fields as Recurrent Neural Networks," In CVPR, 2015.
Zheng Y. et al., "Interactive Images: Cuboid Proxies for Smart Image Manipulation", ACM Trans Graph. (Jul. 2012) 31(4):99-109.
International Search Report and Written Opinion for PCT Application No. PCT/US18/35467, dated Jul. 31, 2018.
"Single Cue—Upgrade Your Viewing E perience", in 7 pages; download Oct. 28, 2017 from URL: https://singlecue.com/.
Heun et al., Smarter Objects: Using AR technology to Program Physical Objects and their Interactions,; Work-in-Progress: Augmented Reality, CHI 2013: Changing Perspectives, Paris, Francem pp. 961-966.

* cited by examiner

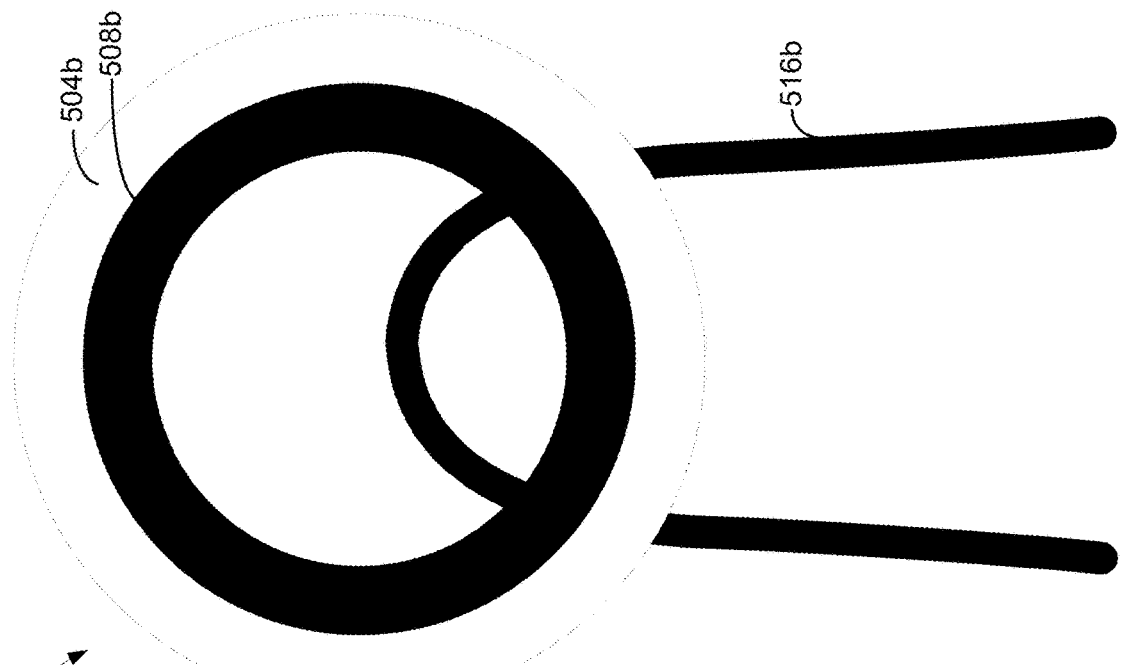
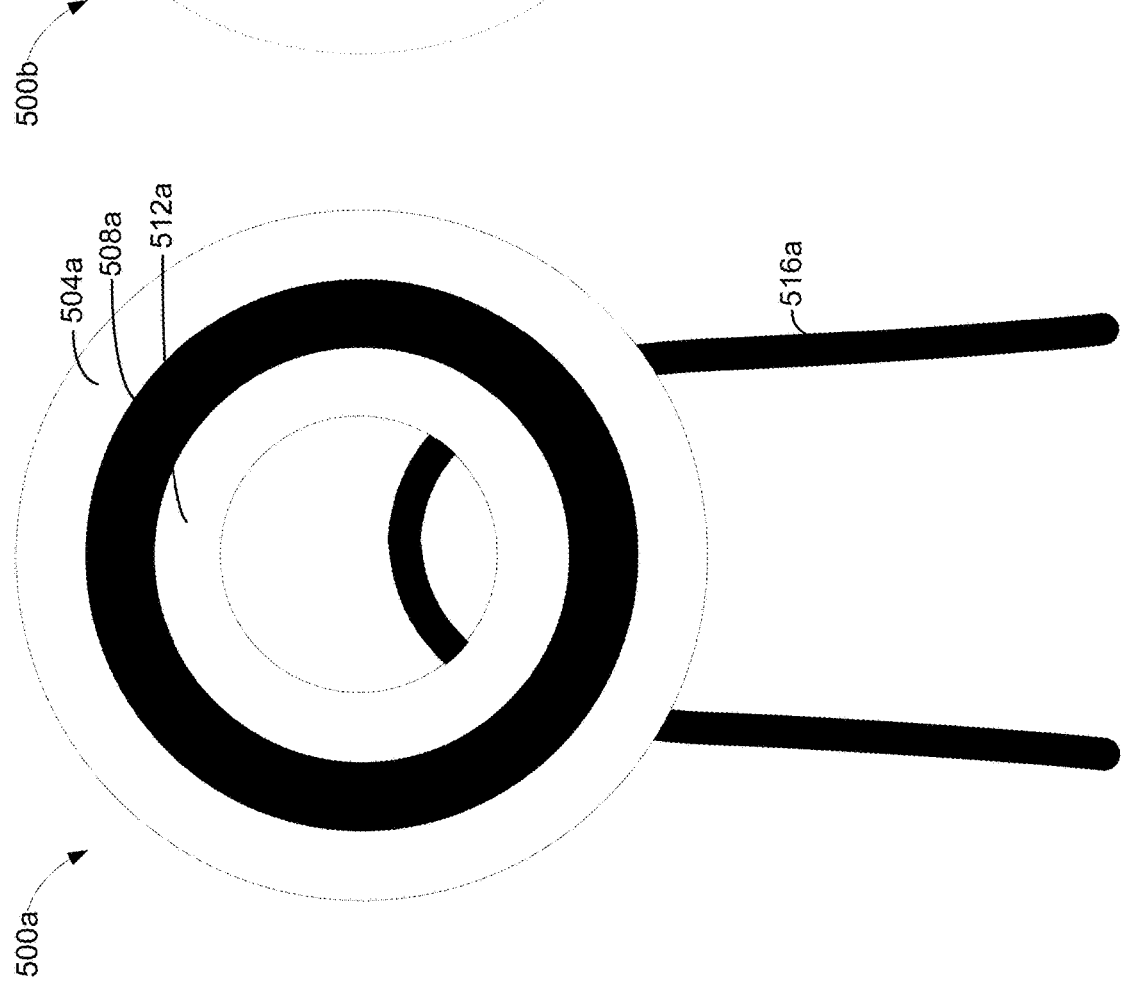

TRAINING A NEURAL NETWORK WITH REPRESENTATIONS OF USER INTERFACE DEVICES

CROSS-REFERENCE TO RELATED APPLICATIONS

This application claims the benefit of priority to U.S. Provisional Application No. 62/537,311, filed on Jul. 26, 2017, entitled "TRAINING A NEURAL NETWORK WITH REPRESENTATIONS OF USER INTERFACE DEVICES," the content of which is hereby incorporated by reference herein in its entirety.

FIELD

The present disclosure relates to virtual reality and augmented reality imaging and visualization systems and in particular to representations of user interface devices for training and using a machine learning model (e.g., a neural network) for determining user interface events.

BACKGROUND

A deep neural network (DNN) is a computation machine learning model. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight of a NN can be approximately analogous to the synaptic strength of a neural connection in a biological system. Weights affect the strength of effect propagated from one layer to another. The output of an artificial neuron (or a node of a NN) can be a nonlinear function of the weighted sum of its inputs. The weights of a NN can be the weights that appear in these summations.

SUMMARY

In one aspect, a wearable display system is disclosed. The wearable display system comprises: an image capture device configured to capture an image comprising a pointer; non-transitory computer-readable storage medium configured to store: the image, a virtual user interface (UI) device associated with the image at an image location on the image, and a neural network for determining a UI event trained using: a training image associated with a training virtual UI device, the training image comprising a representation of the training virtual UI device and a training pointer, and a training UI event with respect to the training virtual UI device and the training pointer in the training image; a display configured to display the virtual UI device at a display location when the image is captured by the image capture device, wherein the image location is related to the display location; and a hardware processor in communication with the image capture device, the display, and the non-transitory computer-readable storage medium, the processor programmed by the executable instructions to: receive the image from the image capture device; render a representation of the virtual UI device onto the image at the image location; and determine, using the neural network, a UI event with respect to the pointer in the image and the virtual UI device associated with the image.

In another aspect, a system for training a neural network for determining a user interface event is disclosed. The system comprises: computer-readable memory storing executable instructions; and one or more processors programmed by the executable instructions to at least: receive a plurality of images, wherein an image of the plurality of images comprises a pointer of a plurality of pointers, wherein the image is associated with a virtual user interface (UI) device of a plurality of virtual UI devices at an image location on the image, and wherein the image is associated with a UI event of a plurality of UI events with respect to the virtual UI device and the pointer in the image; render a representation of the virtual UI device onto the image at the image location to generate a training image; generate a training set comprising input data and corresponding target output data, wherein the input data comprises the training image, and wherein the corresponding target output data comprises the UI event; and train a neural network, for determining a UI event associated with the virtual UI device and the pointer, using the training set.

In yet another aspect, a method for training a neural network for determining a user interface event is disclosed. The method is under control of a hardware processor and comprises: receiving a plurality of images, wherein a first image of the plurality of images comprises a first representation of a pointer of a plurality of pointers, wherein the first image is associated with a first representation of a virtual user interface (UI) device of a plurality of virtual UI devices at a first image location in the first image, and wherein the first image is associated with a UI event of a plurality of UI events with respect to the virtual UI device and the pointer in the first image; rendering a first representation of the virtual UI device onto the first image at the first image location to generate a first training image; generating a training set comprising input data and corresponding target output data, wherein the input data comprises the first training image, and wherein the corresponding target output data comprises the UI event; and training a neural network, for determining a UI event associated with the virtual UI device and the pointer, using the training set.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the subject matter of the disclosure.

BRIEF DESCRIPTION OF THE DRAWINGS

FIGS. 5A-5D illustrate example representations of a user interface device.

Figure 1:
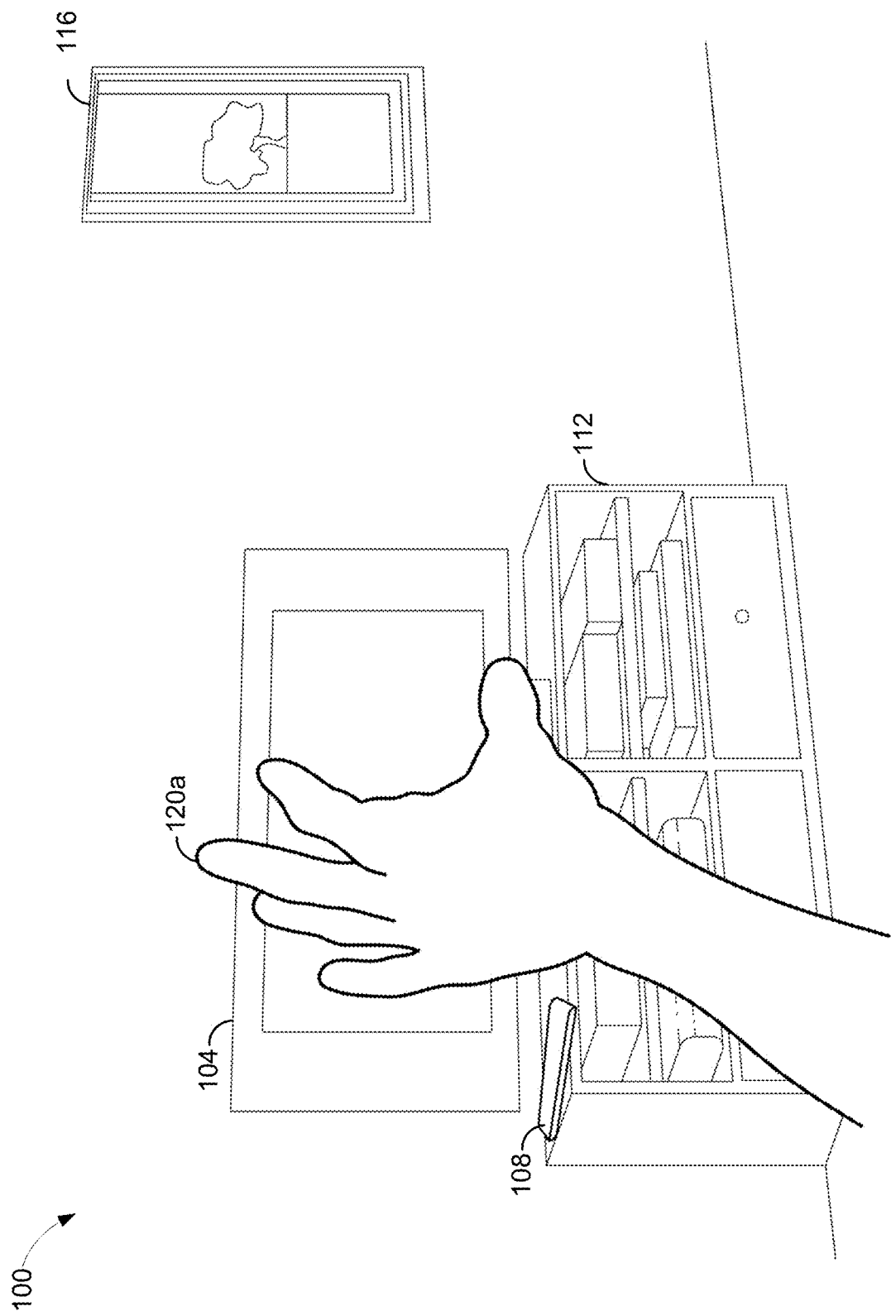
FIG. 1 illustrates an example of a physical environment perceived by a user of an augmented reality device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual user interface (UI) device can be based on the styles or implementations of windows, icons, menus, pointer (WIMP) UI devices. Such virtual UI device styles or implementations are referred herein as a naïve implementation of virtual UI devices. In some embodiments, the process of detecting WIMP UI events is separated into two processes, with the first process being the computation of a location of a pointer (e.g., a finger, a fingertip or a stylus) and the second process being the determination of an interaction of the pointer with the virtual UI device.

One challenge is that two different objects, a pointer and a virtual UI device, need to be localized. On a traditional 2D graphical user interface (GUI), the location of the UI device is known because it is generated in the same coordinates that are used by the GUI pointer device (e.g., a mouse pointer). With an augmented reality device (ARD, such as, e.g., the wearable display system 900 described with reference to FIG. 9), the UI device itself can be generated as appearing at a particular location in the world coordinate system. Errors due to the pose of the ARD and the calibration of the ARD can be introduced. In some implementations, the virtual UI device can be rendered in an ARD coordinate system (e.g., with respect to the coordinate frame of the ARD). With the ARD coordinate system, the calibration of the ARD display can be distinct from the calibration of the one or more outward-facing cameras used to capture images of the pointer for determining the location of the pointer. With either coordinate system, two numbers (e.g., the locations of the virtual UI device and the location of the pointer) may need to be subtracted and zeros or zero-crossings must be detected. The noise in this process can make such analysis very difficult. Challenges remain even if deep neural networks (DNNs), without more, are used to localize the pointer. Disclosed herein are systems and methods for determining such interactions or intersections (referred to herein as UI events) using a DNN directly. In some embodiments, the locations of the pointer and the virtual UI device can also be considered. In some embodiments, focus may be used to determine an interaction or intersection between a pointer and a virtual UI device. The pointer tip and the UI device may need to be in the same focus state for an interaction and a UI event to occur.

The process of training a NN involves presenting the network with both input data and corresponding target output data. This data, comprising both example inputs and target outputs, can be referred to as a training set. Through the process of training, the weights of the network can be incrementally or iteratively adapted such that the output of the network, given a particular input data from the training set, comes to match (e.g., as closely as possible) the target output corresponding to that particular input data.

Constructing a training set for training a NN can present challenges. The construction of a training set can be important to training a NN and thus successful operation of a NN. In some embodiments, the amount of data needed can very large, such as 10s or 100s of 1000s, millions, or more exemplars of correct behavior for the network. A network can learn, using the training set, to correctly generalize its learnings to predict the proper outputs for inputs (e.g., novel inputs that may not be present in the original training set). Disclosed herein are systems and methods for generating training data for training a NN for determining a user interface (UI) event associated with a virtual UI device and a pointer (e.g., activation of a virtual button by a stylus). An example of such systems can be a gesture recognition system.

A display, such as a head mountable augmented reality display (ARD), mixed reality display (MRD), or virtual reality display (VRD) can implement such trained NN for determining a UI event with respect to a virtual UI device and a pointer. Certain examples described herein refer to an ARD, but this is for illustration and is not a limitation. In other examples, a MRD or VRD can be used instead of an ARD. A user can cause a UI event, such as actuation or activation of a virtual UI device (e.g., a button), using a pointer (e.g., a finger, fingertip, or a stylus) to interact with an ARD or devices in the user's environment. The ARD can determine such activation of a virtual UI device or UI event with respect to the virtual UI device and the pointer using the NN. The NN can be trained using images with representations of UI devices rendered on the images.

The representations of UI devices for training the NN and the representations of UI devices displayed to the user by the ARD can be different in styles. For example, a representation of a UI device displayed to the user by the ARD can be a stylized UI device, such as a stylized button. A representation of a UI device rendered on an image for training the NN can include concentric shapes (or shapes with similar or the same centers of gravity) of high contrast. In some implementations, such representations of UI devices can be advantageously standardized such that similar UI devices have similar representations when rendered onto images used for training the NN. The standardized representations of the UI devices for training the NN can be referred to as standard representations of the UI devices. For example, different types of buttons can have similar representations when rendered onto images used for training the NN. Representations of UI devices can be rendered onto images captured (e.g., a monoscopic image, a stereoscopic pair of images, or a multiscopic set of images). The ARD can determine a UI event has occurred by processing an image of the pointer, captured using an outward-facing camera of the ARD while the user is interacting the virtual UI device, using the NN. A standard representation of the UI device can be rendered onto the image captured, as perceived by the user, prior to the NN processes the image to determine the UI event. In some implementations, the standardized representations can be standardized for training multiple NNs for the same, similar, or different tasks (e.g., identifying different types of UI events, such as touching or pointing with a finger).

Examples User Environment

FIG. 1 illustrates an example of a physical environment as perceived by a user of an ARD. The example environment 100 includes a living room of a user's home. The environment 100 has physical objects such as a television (TV) 104, a physical remote control 108 (sometimes simply referred to as a remote), a TV stand 112, and a window 116. While the user is wearing the ARD, the user can perceive the physical objects and interact with the physical objects. For example, the user may watch the TV 104 while wearing the ARD. The user can control the TV 104 using the physical remote 108. For example, the user can control the physical remote 108 to turn the TV 104 on/off or change the channel or volume of the TV 104. The user can also interact with the TV 104 using a virtual remote. The virtual remote may be generated based on the functions of the physical remote 108. For example, the virtual remote may emulate some or all of the functions of the physical remote 108 (and may provide additional or alternative functionality as well).

Figure 9:
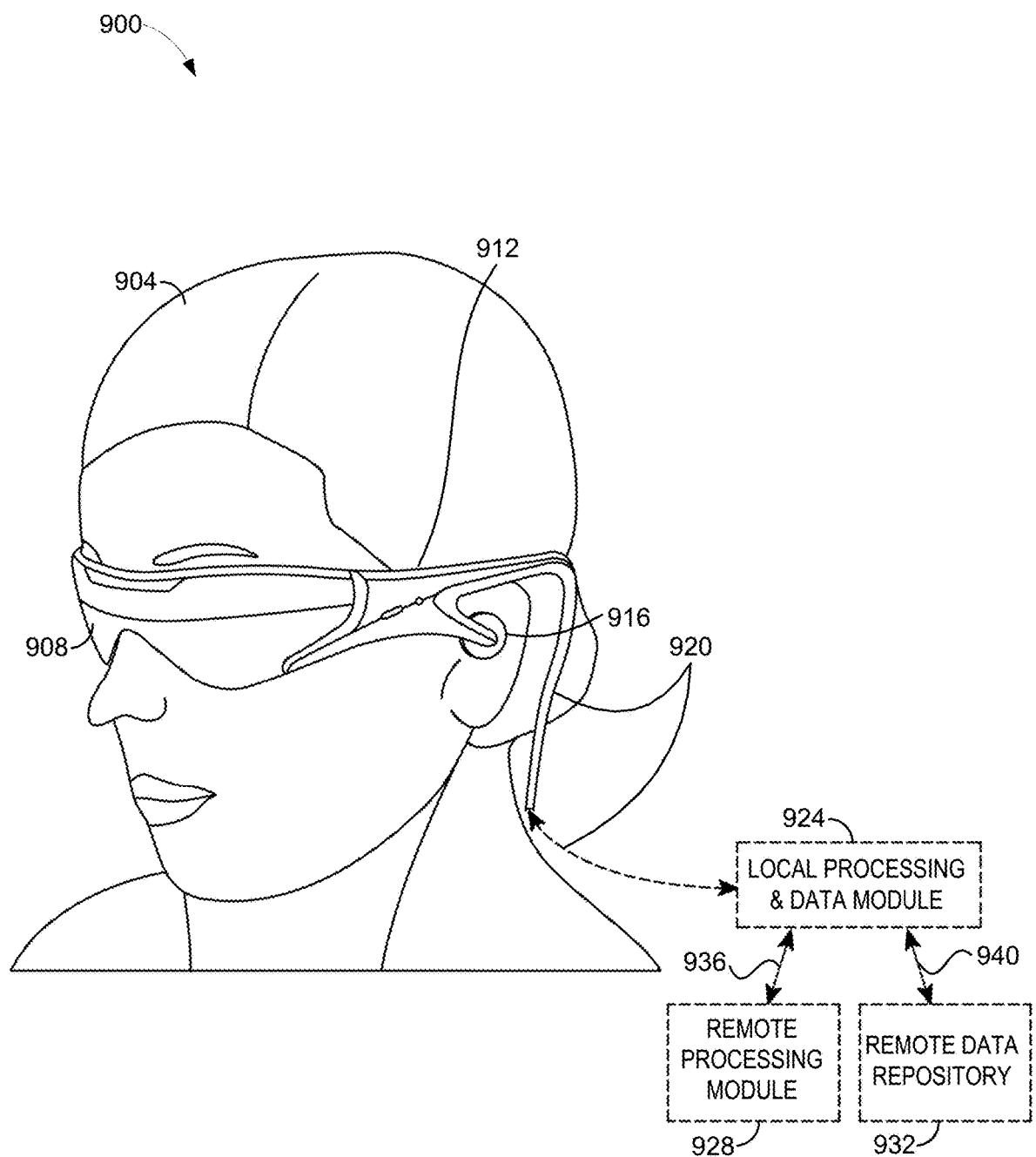
FIG. 9 illustrates an example of a wearable display system, according to one embodiment.

In one implementation, the specification of a virtual remote control can be stored in a data store, such as the remote data repository 932 shown in FIG. 9. The specifications can include instructions on how to render the virtual remote (e.g., specifying the layout, buttons and other controls, etc.), the communications channel needed to emulate the remote (e.g., from the IRDA specification), the actual codes to be emulated on that channel (e.g., the exact IR pulse sequence associated with the selection of "Channel 2", etc.), and so on.

The user can activate a virtual remote. Upon activation, the ARD can render the virtual remote in the user's field of view (FOV). The virtual remote can emulate functions of a target object, such as a physical remote. The user can activate the virtual remote by actuating a user input device such as, e.g., clicking on a mouse, tapping on a touch pad, swiping on a touch screen, hovering over or touching a capacitive button, pressing a key on a keyboard or a game controller (e.g., a 5-way d-pad), pointing a joystick, wand or totem toward the object, pressing a button on a remote control, other interactions with a user input device, etc. The user can also activate the virtual remote using head, eye, or body poses, such as e.g., by gazing or pointing at a target object for a period of time.

In some implementations, to activate the virtual remote, the user can indicate a selection of a target device associated with the virtual remote. For example, the user can indicate a selection of a physical remote to activate a corresponding virtual remote. As shown in FIG. 1, if the user wants to interact with a virtual remote which is based on the functions of the physical remote 108, the user may indicate the physical remote 108 by hand gestures such as touching, pointing with a finger, visually enclosing the objects by, for example, pinching, or using other hand gestures. As an example, the user may point in the direction of the physical remote 108 for an extended period of time. As another example, the user may select a virtual remote associated with the physical remote 108 by making a hand gesture for grabbing the physical remote 108. The user may also indicate the physical remote 108 using a user input device (e.g., the user input device 1104 shown in FIG. 11). For example, the user may point at the physical remote using a stylus. The user can also select a virtual remote by selecting a parent device that the virtual remote controls. The user can use the hand gestures and actuate the user input device for such selection. The user can perceive, via the ARD, the environment 100a. The user can perceive his left arm 120a, which has a pinch gesture with respect to the TV 104. The ARD may recognize this pinch gesture as a command to render and present the virtual remote associated with the TV 104 to the user. As another example, if the user wants to select a virtual remote for controlling the TV 104, the user can use a body pose (such as grabbing the TV 104 or pointing at the TV 104) to indicate a selection of the TV 104.

Example Augmented Environment

In addition to being a display, an ARD (or MRD or VRD) can be an input device. Non-limiting exemplary modes of input for such devices include gestural (e.g., hand gesture) or motions that make use of a pointer, stylus, or other physical objects. A hand gesture can involve a motion of a user's hand, such as a hand pointing in a direction. Motions can include touching, pressing, releasing, sliding up/down or left/right, moving along a trajectory, or other types of movements in the 3D space. In some implementations, virtual user interface (UI) devices, such as virtual buttons or sliders, can appear in a virtual environment perceived by a user. These UI devices can be analogous to two dimensional (2D) or three dimensional (3D) windows, icons, menus, pointer (WIMP) UI devices (e.g., those appearing in Windows®, iOS™, or Android™ operating systems). Examples of these UI devices include a virtual button, updown, spinner, picker, radio button, radio button list, checkbox, picture box, checkbox list, dropdown list, dropdown menu, selection list, list box, combo box, textbox, slider, link, keyboard key, switch, slider, touch surface, or a combination thereof.

Figure 2:
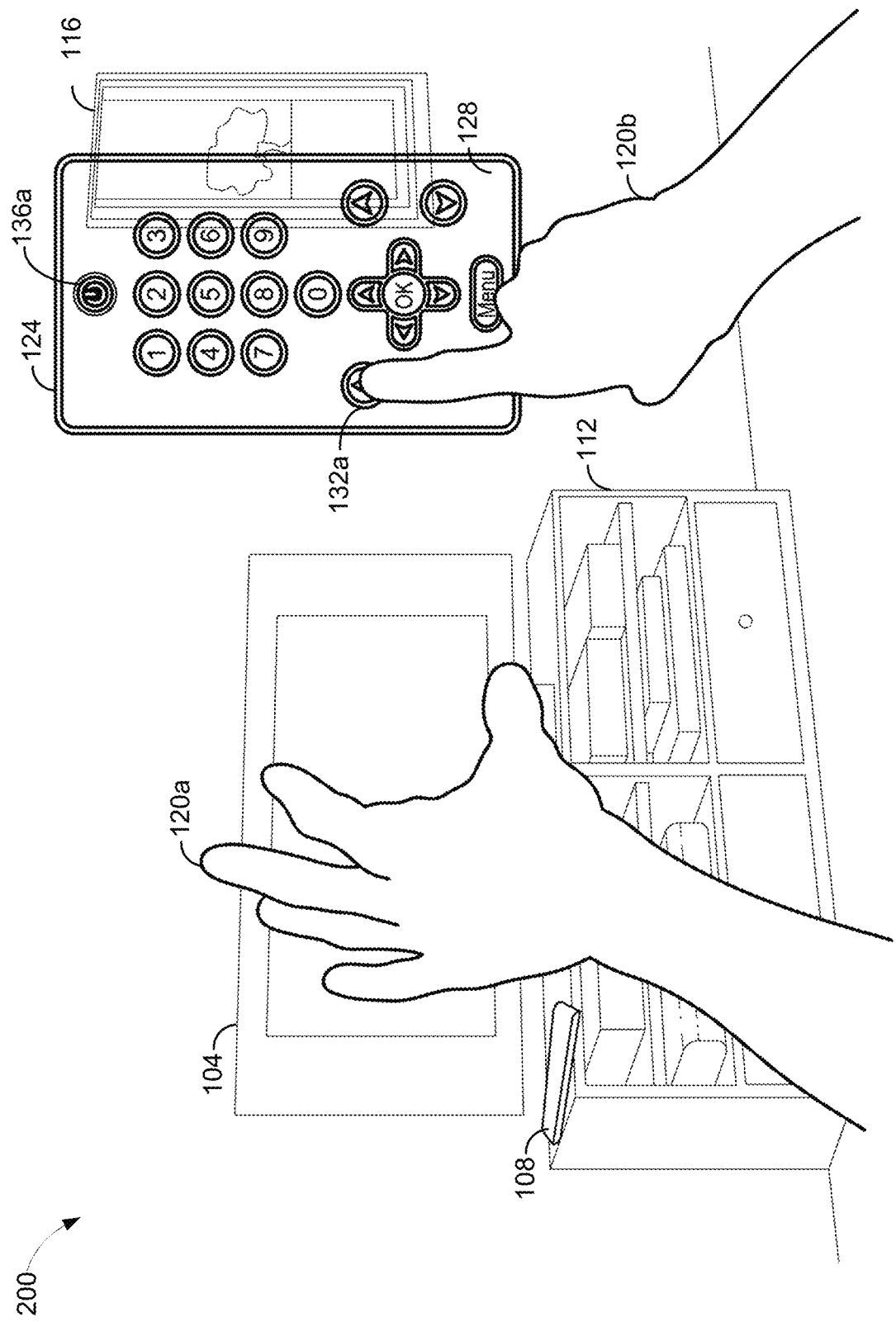
FIG. 2 illustrates an example of an augmented environment including a physical environment and a virtual remote control perceived by a user of an augmented reality device.

FIG. 2 illustrates an example of an augmented environment 200, including a physical environment and a virtual remote control perceived by a user of an augmented reality device. A virtual remote can mirror some or all of the functions or at least a portion of the layout of the physical remote. This may make it easier for a user, who is familiar with the functionality or layout of a physical remote, to operate the virtual remote control. Upon the selection of a virtual remote by a user, an ARD can render the virtual remote so that it appears visually near the user. For example, as shown in FIG. 2, the ARD can render a virtual remote 124, including a control panel 128, as appearing within the user's reach (e.g., within an arm's length) at a particular location in three dimension (3D) so that the user can conveniently interact with the virtual remote 124. In some embodiments, as the user moves around in his environment, the virtual remote may accordingly move with the user. For example, the ARD can present the virtual remote 124 at a certain distance from the user regardless of the user's current position in the user's environment.

The ARD can render the virtual remote 124 as superimposed onto the user's physical environment. For example, the ARD may render the virtual remote 124 as if it is in front of a wall. The virtual remote 124 can have a non-transparent rendering such that the user can perceive the virtual remote occluding a portion of the user's physical environment, so that the virtual remote appears as if in front of the portion of the environment. In some implementations, the virtual remote 124 may be rendered at least partially transparent so that the user may see through the virtual remote. For example, as shown in FIG. 2, the user can see the window sill as well as the wall even though the user may perceive the virtual remote 124 as being in front of the window and the wall. Portions of the virtual remote (e.g., virtual UI devices, such as buttons, that can activated or actuated by the user) may be rendered less transparently than other portions (e.g., a body or frame) so that the virtual remote 124 occludes less of the background environment.

The user can also move the rendering location, size, or orientation of the virtual remote 124. For example, the user can move the virtual remote 124 closer (or away) to the user, upward/downward, left/right, and so on. The user can also fix the rendering location of the virtual remote 124 to be at a certain distance from the user or be at a certain location (e.g., as appearing to the user in three dimension) in the user's environment.

The user can cause a UI event, such as actuation or activation of a virtual UI device (e.g., a button) of a virtual remote 124, by using a pointer (e.g., a finger, fingertip, or a stylus) to interact with the ARD or devices in the user's environment (e.g., the TV 104). The ARD can determine such activation of a virtual UI device or UI event with respect to the virtual UI device and the pointer using a NN. The NN can be trained using images with representations of UI devices, described in further detail below, that can be different from the representations of the UI devices shown to the user by the ARD. A representation of a UI device, for rendering onto one or more images for training the NN, can include concentric shapes (or shapes with similar or the same centers of gravity) of high contrast. Such representations of the UI devices can be rendered onto images captured (e.g., a monoscopic image, a stereoscopic pair of images, or a multiscopic set of images). The ARD can determine a UI event has occurred by processing an image of the pointer, captured using an outward-facing camera of the ARD while the user is interacting the virtual UI device, using the NN. A standard representation of the UI device can be rendered onto the image captured, as perceived by the user, prior to the NN processes the image to determine the UI event.

The representations of the UI devices for training the NN can be advantageously standardized in some implementations such that similar UI devices have similar representations when rendered onto images used for training the NN. For example, in some implementations, a standard representation of the UI device is a drawable, renderable representation visualization that is used for any type of UI device of a particular type. The standard representation used by the NN may, but need not, be the same as the representation that is made visible to a user by the ARD. A particular type of device can be arranged according to an industry standard or other logical grouping or taxonomy of device types (e.g., television remote controls, or television remote controls by manufacture, or television remote controls by manufacturer and television class (e.g., LCD display, LED display, diagonal size, price, etc.)). In other cases, the standard representation may refer to functionality such as a standard representation for a depressable button, a standard representation for a slider bar, a standard representation for a touch screen, and so forth. The standardized representations of the UI devices for training the NN can be referred to as standard representations of the UI devices. For example, different types of buttons can have similar representations when rendered onto images used for training the NN. In some implementations, the standardized representations can be standardized for training multiple NNs for the same task, similar tasks (e.g., pressing a button or releasing a button pressed), or different tasks (e.g., identifying different types of UI events, such as touching or pointing with a finger).

In FIG. 2, the user can perceive the environment 200 using the ARD. The environment 200 can include physical objects such as the TV 104, the physical remote 108 for controlling the TV 104, the TV stand 112, and the window 116. The environment 200 can also include a virtual remote 124. The virtual remote 124 can emulate the functions of the physical remote 108 to control the TV 104. For example, the layout and functions of virtual UI devices, such as a button 132a, of the virtual remote 124 may be substantially the same as the physical buttons of the physical remote 104.

The virtual remote 124 may include virtual UI devices, such as a virtual keyboard, a virtual button, a virtual switch, toggle, or slider, a virtual touch surface, or any components thereof (e.g., a key of a keyboard). These virtual UI devices may be part of the control panel 128 of the virtual remote 124. To interact with the virtual remote 124, the user can initiate an UI event (e.g., activating or deactivating) with respect to a virtual UI device. For example, the user can interact with a virtual UI device 132a by touching, pressing, releasing, sliding up/down or left/right, moving along a trajectory, or other types of movements in the 3D space.

Upon actuation or activation of a virtual UI device, such as a virtual button of the virtual remote 124, the ARD may communicate with the TV 104 as if it were the physical remote 108. As an example, in FIG. 2, the user can use a pointer (e.g., a finger of a right hand 120b or a stylus) to activate a virtual UI device 132a. The ARD can use an outward-facing imaging system to image the location of the pointer. As further described below, based on the location of the pointer, the ARD can compute which a UI event (such as activation) with respect to the virtual UI device and the pointer. In the example depicted in FIG. 2, the ARD can determine that the user's right index finger is activating the button 132a. In addition to activating a virtual button using a hand gesture, the user can also activate the virtual button using a user input device, such as a stylus, a pointer, a wand or a totem.

Once the ARD detects that the user has activated a virtual UI device of the virtual remote 124, the ARD can accordingly send a signal, via a signal generator such as an IR emitter, to a corresponding device (e.g., the TV 104) to instruct the device to perform an action based on the virtual UI device by the user. For example, the user can touch the virtual button 132a on the virtual remote 124. If this button 132a is associated with increasing the volume of the TV 104, the ARD can accordingly generate a signal (such as an IR signal generated by an IR emitter on the ARD) and communicate the signal to the TV 104 (which may have an IR detector), thereby causing the TV 104 to increase its volume. The signal generated by the ARD can be the same signal that would be generated by the corresponding physical remote control.

In cases where the signal is a line-of sight signal (such as an IR signal that must be directed at the IR detector of the TV), the emitter on the ARD may need to be directed toward the device (just as a physical remote control must be pointed at its associated device). Advantageously, the ARD may be configured to determine whether the requested command (e.g., to increase the volume of the TV 104 or change a channel) has occurred (e.g., by using a microphone on the ARD to determine an increase in sound intensity or an outward-facing camera to determine the display of the TV 104 has changed, respectively). If the effect of the command has not been produced by the device being controlled, the ARD may instruct the user to change the user's pose so that the emitter of the ARD is directed toward the device being controlled. For example, the ARD may generate a visual graphic (or audible instruction) to point the user's head toward the device being controlled. In some implementations, the communication between the ARD and the device may not require an unobstructed line-of-sight e.g., when wireless RF signals or ultrasonic acoustic signals are used), and the foregoing functionality may be optional.

When the user is done with the virtual remote 104, the user may use a hand gesture to cause the display of the virtual remote 124 to disappear. As an example, while the user is watching a TV program, the user may decide that he does not need the virtual remote any more. As a result, the user may wave his hand to indicate that he is done with the virtual remote 124. The user may also press a virtual UI device (e.g., a power button 136*a*) on the virtual remote 124 to dismiss the virtual remote 124. The ARD may, in response, cease displaying the virtual remote 124 or display the virtual remote 124 so that it is substantially less visually perceptible (e.g., with increased transparency), which may assist the user in later selecting the virtual remote 124.

In certain implementations, the ARD may temporarily hide the virtual remote 124 from the user's FOV or move the virtual remote outside of the user's FOV or to an edge of the user's FOV automatically or in response to a user command. For example, the ARD can also automatically hide a virtual remote 124 if a threshold condition is met. The ARD can detect that none of the virtual UI devices, such as the buttons of the virtual remote 124, have been inactive for a threshold period of time (such as 10 seconds, 1 minute, 2 minutes, etc.). The ARD can gradually fade out the virtual remote 124, such as by increasing the transparency of the virtual remote 124. For example, the virtual remote 124 may change from non-transparent to transparent as part of the fading out process. The ARD can also fade out the virtual remote 124 by decreasing the visibility of the virtual remote 124. For example, the ARD can gradually reduce the size of the virtual remote 124 or change the color of the virtual remote 124 from a dark color to a light color.

Although some examples herein are described in the context of using a virtual remote control (e.g., activating one or more virtual UI devices, such as buttons, of a virtual remote control) to control a physical device (e.g., a physical television), this is for illustration only and is not intended to be limiting. Embodiments of the virtual remote control or virtual UI devices can be used, additionally or alternatively, to control virtual devices. For example, a user of the ARD can use a virtual remote control to control a virtual television that is rendered by the ARD and displayed to the user.

Example Rendering of Representations of UI Devices

Disclosed herein are systems and methods for generating a training set, including example inputs and target outputs, training a neural network (NN) using the training set, and using a trained NN. The topology of the NN can be any functional topology, such as Alex-Net or a derivative of it. The topology of the NN can include a recurrent network, which can be used to provide temporal context to the category classification.

A NN can be trained using an input data set that is categorical. For example, different UI events (e.g., a virtual UI device is activated or not activated) can correspond to different categorical values in the input data set. In some embodiments, the input data set can include some quantitative values. The NN can be trained to recognize two or more state corresponding to different categorical values, such as a state of a virtual UI device being activated and a state of the virtual UI device not being activated. For example, if the virtual UI device is a button, then the NN can be trained to recognize the states: "pressed" and "not pressed." Other states, such as "touching," can be possible.

The example inputs and target outputs can include images with representations of virtual UI devices rendered on them. The representation of a UI device rendered on an image may not be the representation visible to the user, but rather a drawable, renderable visualization that can be used for UI devices of a particular type. For example, all button type UI devices can be represented as a solid white disk in some implementations.

In some embodiments, a trained NN can use a camera image to determine if a UI event has taken place. A camera can be placed so as to see a pointer (e.g., a finger or a stylus), and the images captured can be given to the NN as input. The output of the NN can include a determination as to if a UI event has taken place, and if so, the particular UI event that has occurred.

In some embodiments, the UI device, in its representation for training the NN, can be rendered onto every image that is input to the NN, both in training, as well as in operation. "Rendered onto" can refer to that the UI device, in its representation, is rendered to appear precisely as it would at its virtual location if viewed from the location of the camera used to capture the image (and with the view frustum appropriate for the measured intrinsic parameters of the camera and its associated lens, alone or in combination; intrinsic parameters can include, e.g., focal lengths, principal point offsets, and axis skew of the camera).

In this way, the image is an augmented image, containing both the pointer and the representation of the virtual UI device. When the NN is trained, all images presented can have such representations of one or more virtual UI devices rendered on each. Each such image can be associated with its state (e.g., "button pressed"). Negative examples can be similarly provided to the DNN during the training process, in which the UI devices can be rendered on the images but the virtual UI device may not be activated (e.g., "button not pressed").

Figure 3:
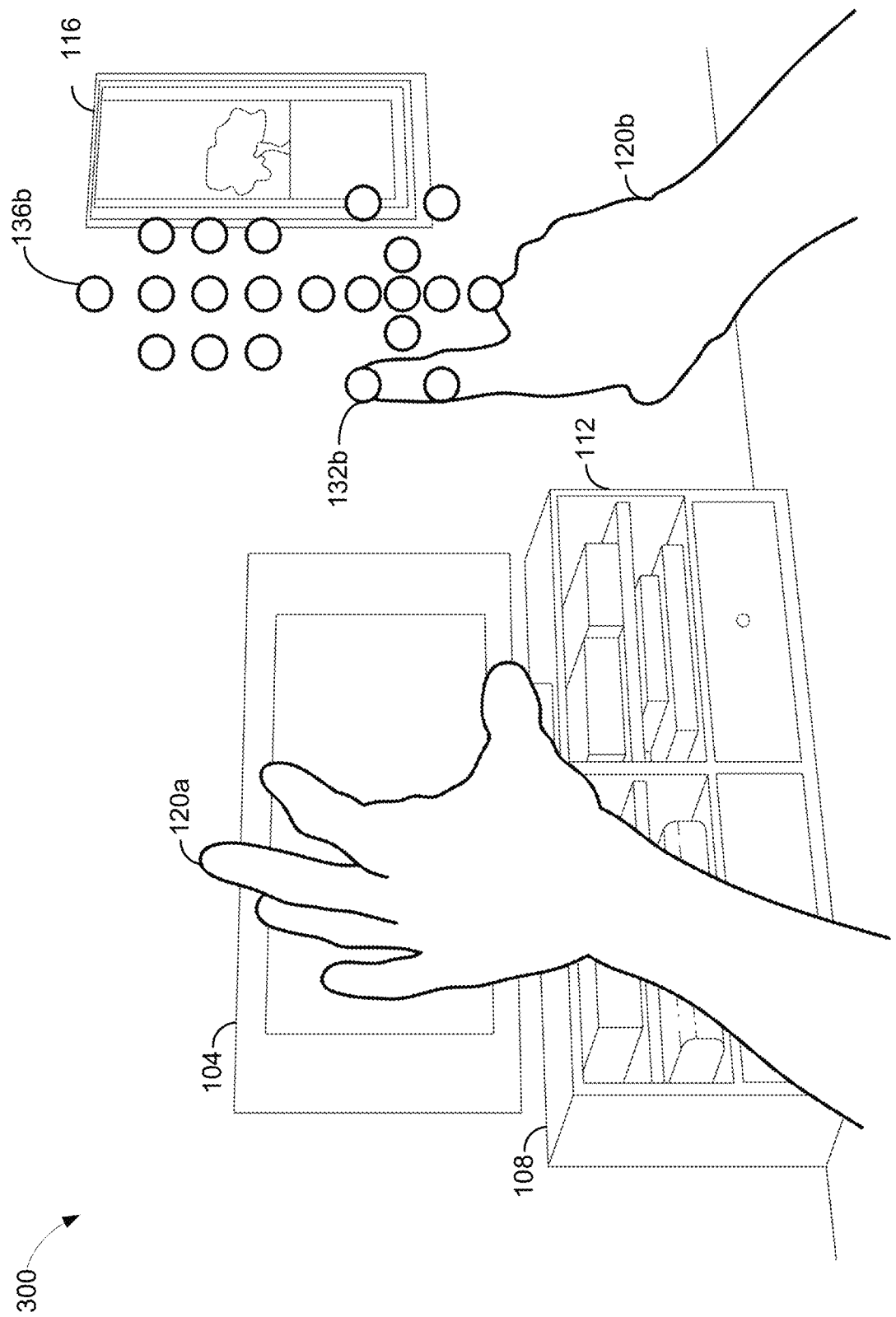
FIG. 3 illustrates an example of representations of buttons of a virtual remote control rendered onto an image, corresponding to a physical environment perceived by a user, captured by an imaging device of an augmented reality device.

FIG. 2 illustrates an example of an augmented environment 200 including a physical environment and a virtual remote control perceived by a user of an augmented reality device. A user interface, including a remote control 124 and virtual UI events (e.g., a button 132*a*) can be presented visually to the user in any appropriate graphical form. The DNN can be given a modified version of the image of the user's environment perceived by the user and captured by a camera (such as the outward-facing imaging system 1154 in FIG. 11). For example, the modified image can include annotated virtual UI devices, such as the standardized representations for the UI devices, not the version actually shown to the user (FIG. 3). FIG. 3 illustrates an example environment 300 including example representations of buttons of a virtual remote control rendered onto an image, corresponding to a physical environment perceived by a user, captured by an imaging device of an augmented reality device.

In some embodiments, representations of buttons or UI devices can be rendered without occlusion, such that the representations can appear "on top of" (e.g., from the point of view of the image) the pointer (FIG. 3). For example, a representation 132b of the button 132a is shown in FIG. 3 with the fingertip of the user occluded. The representation 132b of the button 132a appears as "on top of" the fingertip of the user. The NN can advantageously determine UI events in images with representations rendered with or without occlusion, whether the NN is trained using images with representations rendered with or without occlusion. Examples of representations of UI devices are described below with reference to FIGS. 5A-5D.

In some embodiments, the locations of the pointer and the virtual UI device can also be considered. In some embodiments, focus may be used to determine an interaction or intersection between a pointer and a virtual UI device. The pointer tip and the UI device may need to be in the same focus state for an interaction and a UI event to occur.

In some embodiments, multiple virtual UI devices may be present to a user simultaneously. For example, as shown in FIG. 2, a user can perceive a plurality of virtual UI devices of a remote control 124, such as the buttons 132a, 136a. The image with representations rendered on it can include representations of a plurality of buttons (e.g., representations 132b, 136b of the buttons 132a, 136a as shown in FIG. 3). The particular virtual UI device involved in a UI event can be determined. For example, when generating the training set, the virtual UI device involved in a UI even can be determined post facto after the image is captured. Methods based on localization of the pointer with respect to the virtual UI devices can be used for this post facto determination as the required precision may be less.

Figure 4A:
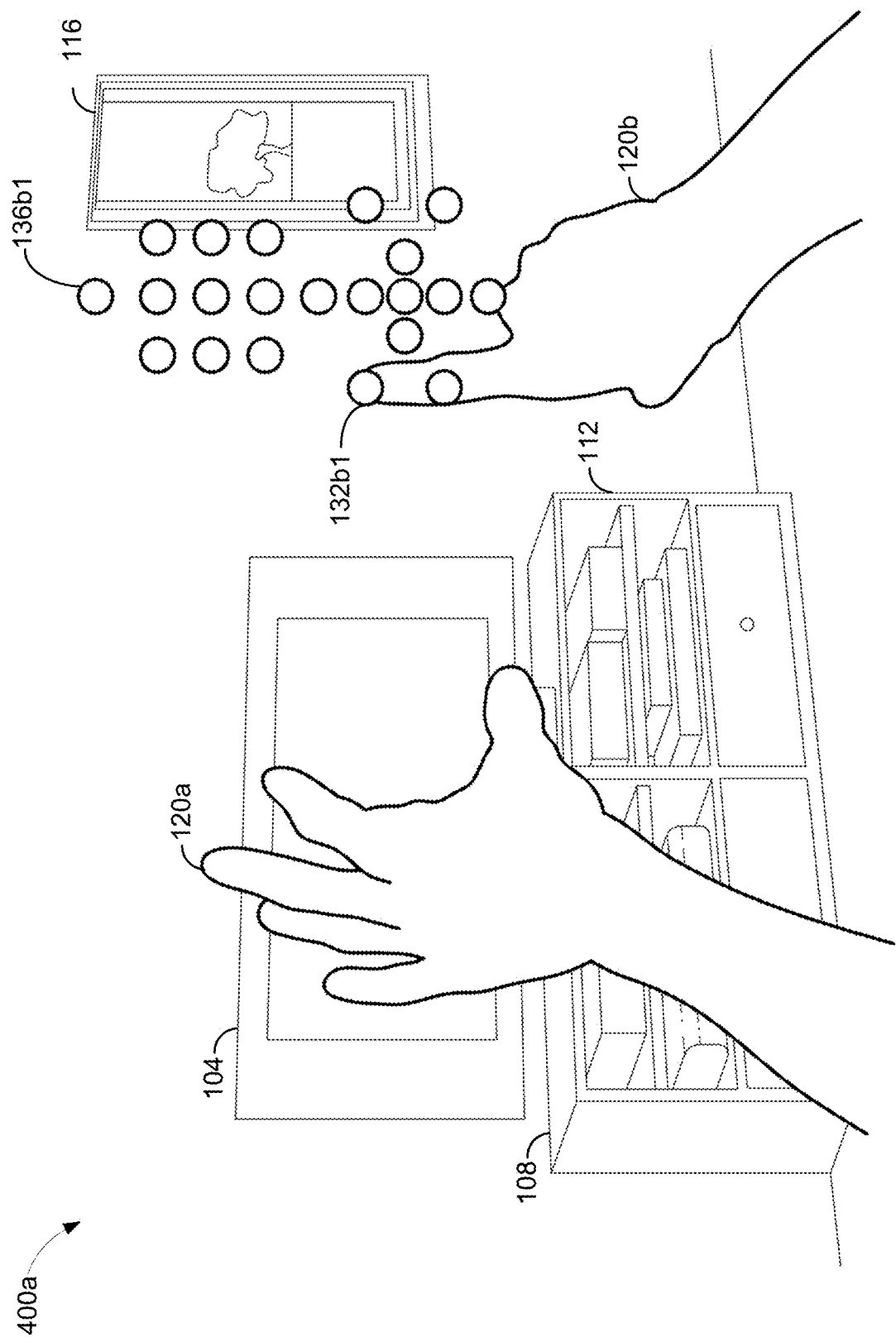
FIGS. 4A and 4B illustrate an example stereoscopic pair of images captured by two imaging devices of an augmented reality device with representations of buttons rendered on the images.
Figure 4B:
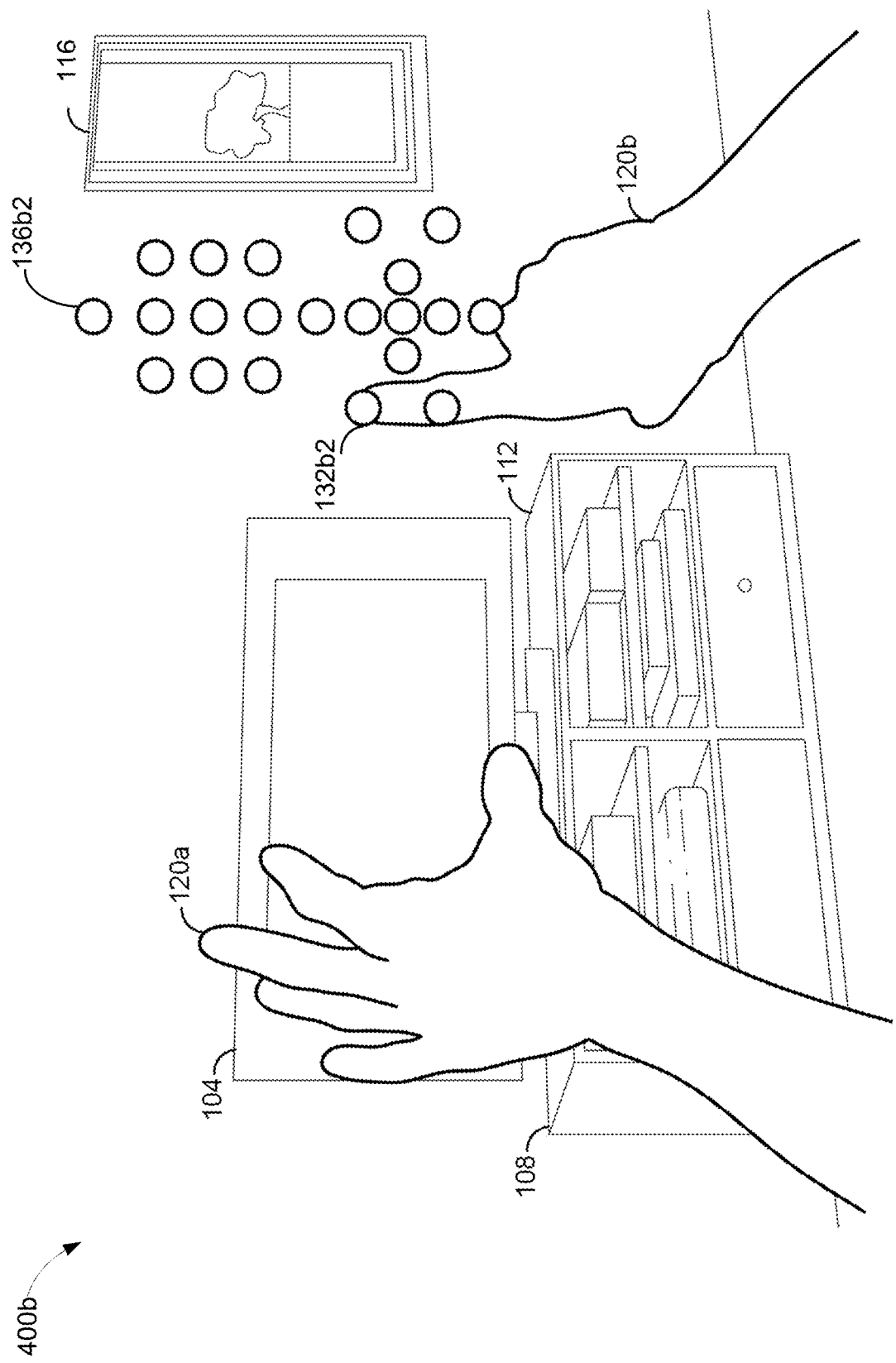

In some embodiments, the training set can include pairs of stereoscopic images. For example, a forward-facing imaging system of an ARD can include two or more imaging devices (e.g., cameras) for capturing stereoscopic images. FIGS. 4A and 4B illustrate an example stereoscopic pair of images 400a, 400b captured by two imaging devices of an augmented reality device with representations of buttons rendered on the images. For example, representation 132b1, 136b1 of the buttons 132a, 136a are shown in image 400a, and corresponding representation 132b2, 136b2 of the buttons 132a, 136a are shown in image 400b. The representations 132b1, 132b2 of the button 132a in the pair of images 400a, 400b appear as "on top of" the fingertip of the user. In FIGS. 4A-4B, the left hand 120a is closer than the right hand 120b to the user, and the television 104 and background (e.g., the wall) is farther from the right hand 120b, as seen by the visible disparities between the locations of the left hand 120a and the TV 104 in the images 400a, 400b. Because the right hand 120b and the UI devices and their representations (e.g., the buttons 132a, 136a and their corresponding representations 132b1, 132b2, 136b1, 136b2) are at the same depth, no relative disparity between the right hand 120b and the UI devices and their representations exist. In some implementations, sets of monoscopic images can be used in training the NN and determining UI events using the NN. For example, a forward-facing imaging system of an ARD can include multiple imaging devices (e.g., cameras) for capturing multiscopic images. Such NN can advantageously have superior results can be expected in that case.

Example Representations of UI Devices

Figure 5D:
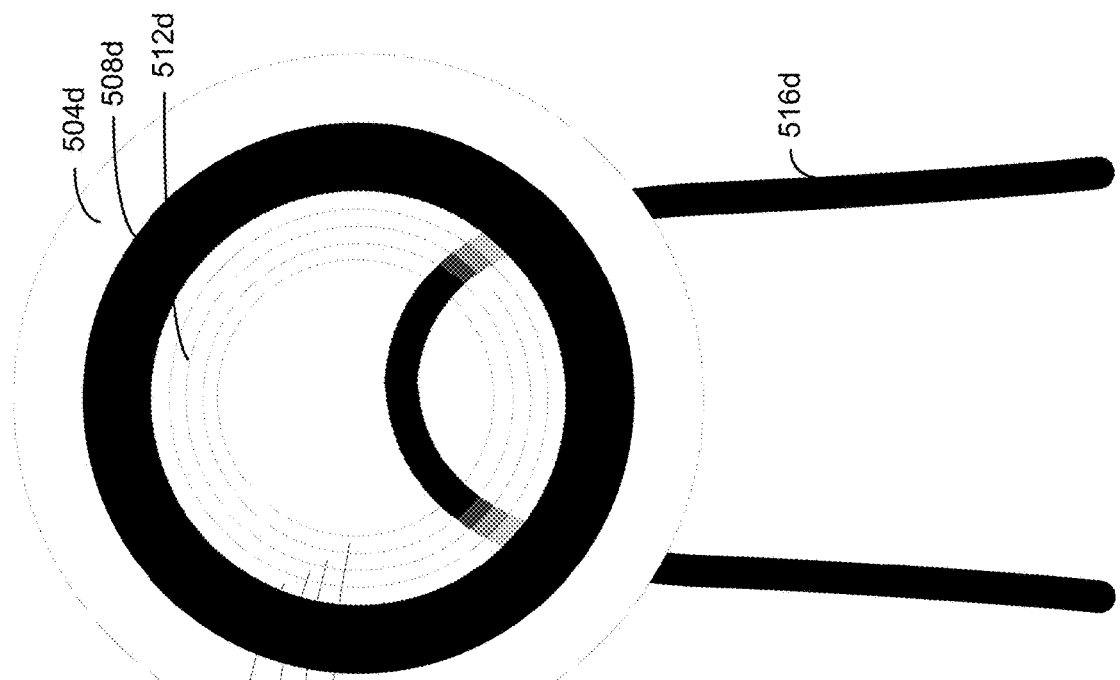

FIGS. 5A-5D illustrate example representations of a user interface (UI) device. To facilitate a distinct image of the UI device, a representation of a UI device for training a NN can include concentric shapes (or shapes with similar or the same centers of gravity) of high contrast. FIG. 5A shows a representation 500a of a button with three concentric rings 504a-512a rendered onto a fingertip 516a without occlusion by the fingertip 516a. The representation 500a can include a black ring 508a with a white ring 504a outside the black ring 508a and a white ring 512a within the black ring 508a. The dotted lines shown adjacent the white rings 504a and 512a in FIG. 5A (and FIGS. 5B-5D) are not part of the representation of the button 500a. The dotted lines are shown in FIG. 5A to delineate the white rings from the portion of the image, captured by an outward-facing imaging system, surrounding the representation 500a being rendered.

Figure 5C:
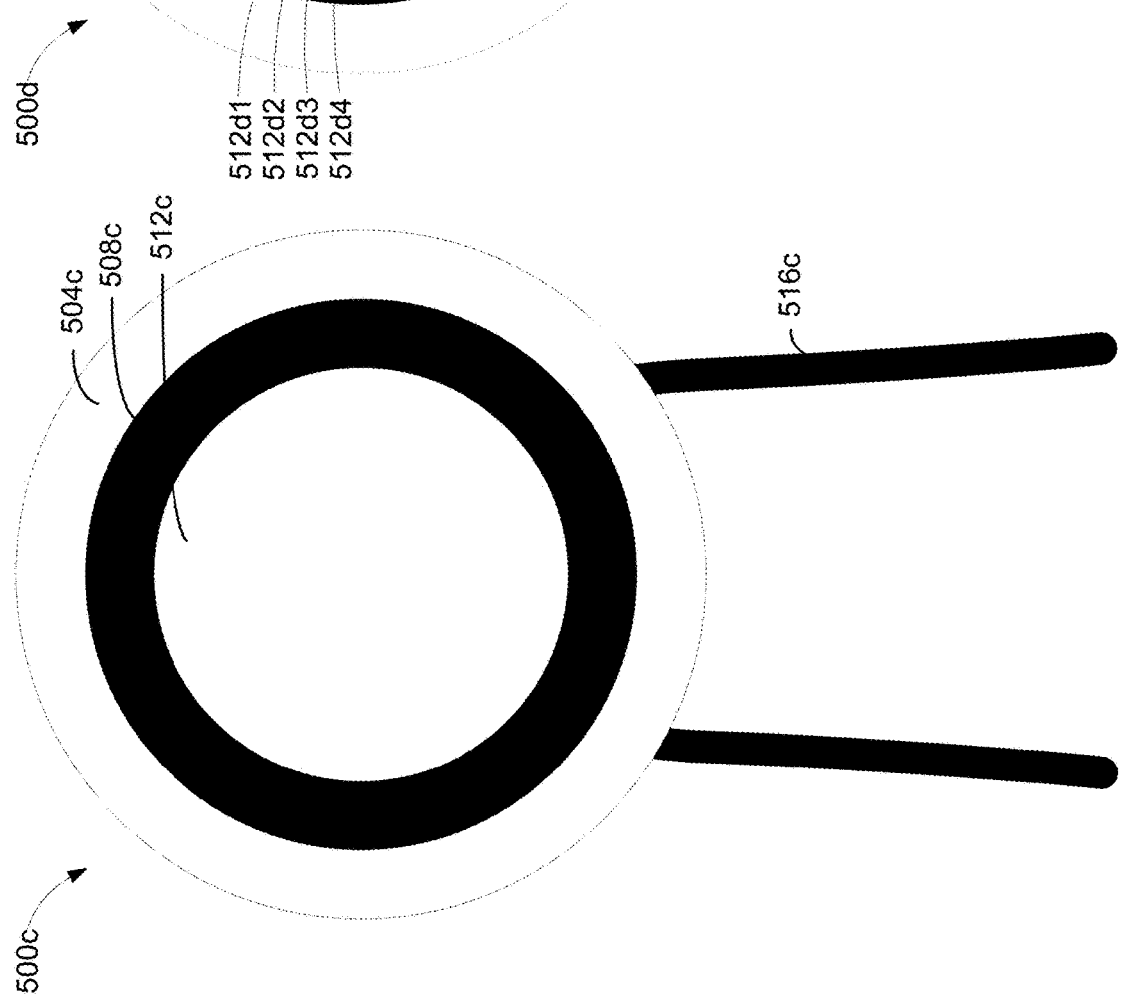

FIG. 5B shows a representation 500b of a button with two concentric rings 504b-508b rendered onto a fingertip 516b without occlusion by the fingertip 516b. The representation 500b can include a black ring 508b with a white ring 504b outside the black ring 508b and no white ring within the black ring 508b. FIG. 5C shows a representation 500c of a button with two rings 504c-508c and a circle 512c rendered onto a fingertip 516c without occlusion by the fingertip 516c. The representation 500c can include a black ring 508c with a white ring 504c outside the black ring 508c and a white circle within the black ring 508c.

FIG. 5D shows a representation 500d of a button with three concentric rings 504d-512d rendered with alpha blending onto a fingertip 516d without occlusion by the fingertip 516d. The representation 500d can include a black ring 508d with a white ring 504d outside the black ring 508d and a white ring 512d, within the black ring 508a, rendered with alpha blending such as the ring is increasingly transparent (e.g., alpha transparency value approaching zero) as the distance from the black ring increases. The four dotted lines shown on top of the white ring 5 are not part of the representation of the button 500d. These dotted liens are shown in FIG. 5D to delineate the regions of the white ring 512d with different transparency values. In some embodiments, the four regions of the white ring 512d can be considered as four concentric rings 512d1-512d4 with different transparency values.

In some implementations, rendering of representations onto images for training a NN may or may not take into account of occlusion by a pointer. For example, images of a pointer can be captured either stereoscopically, with structured light projection, a time of flight camera, or a combination thereof. From these images, a depth field can be associated with any image. This depth field can be used to provide occlusion to the representation of the UI device when rendering both the training and input data.

Example Machine Learning Models and NNs

In some embodiments, a machine learning model comprises a classification model. The classification model can comprise a supervised classification model, a semi-supervised classification model, an unsupervised classification model, or a combination thereof. The machine learning model can comprise a neural network, a linear regression model, a logistic regression model, a decision tree, a support vector machine, a Naïve Bayes network, a k-nearest neighbors (KNN) model, a k-means model, a random forest model, or any combination thereof. The machine learning model can comprise an association rule learning model, an inductive logic programming model, a reinforcement learning model, a feature learning model, a similarity learning model, a sparse dictionary learning model, a genetic algorithm model, a rule-based machine learning model, a learning classifier system model, or any combination thereof.

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function $ReLU(x)$ can be, for example, $\max(0, x)$. The PReLU layer can apply a PReLU function to its input to generate its output. The PReLU function $PReLU(x)$ can be, for example, $x$ if $x \geq 0$ and $ax$ if $x<0$, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. For example, different NNs of the plurality of NNs can be trained for determining occurrences of different UI events (e.g., different types of activating virtual UI devices, such as touching or pointing) with respect to similar types of virtual UI devices and pointers. As another example, different NNs of the plurality of NNs can be trained for determining occurrences of similar UI events with respect to similar types of virtual UI devices and different pointers (e.g., a stylus or a fingertip). As a further example, different NNs of the plurality of NNs can be trained for determining occurrences of similar UI events with respect to different types of virtual UI devices (e.g., a button or a slider) and pointers. A processor (e.g., a processor of the local data processing module 924 in FIG. 9) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Neural Network Training Method

Figure 6:
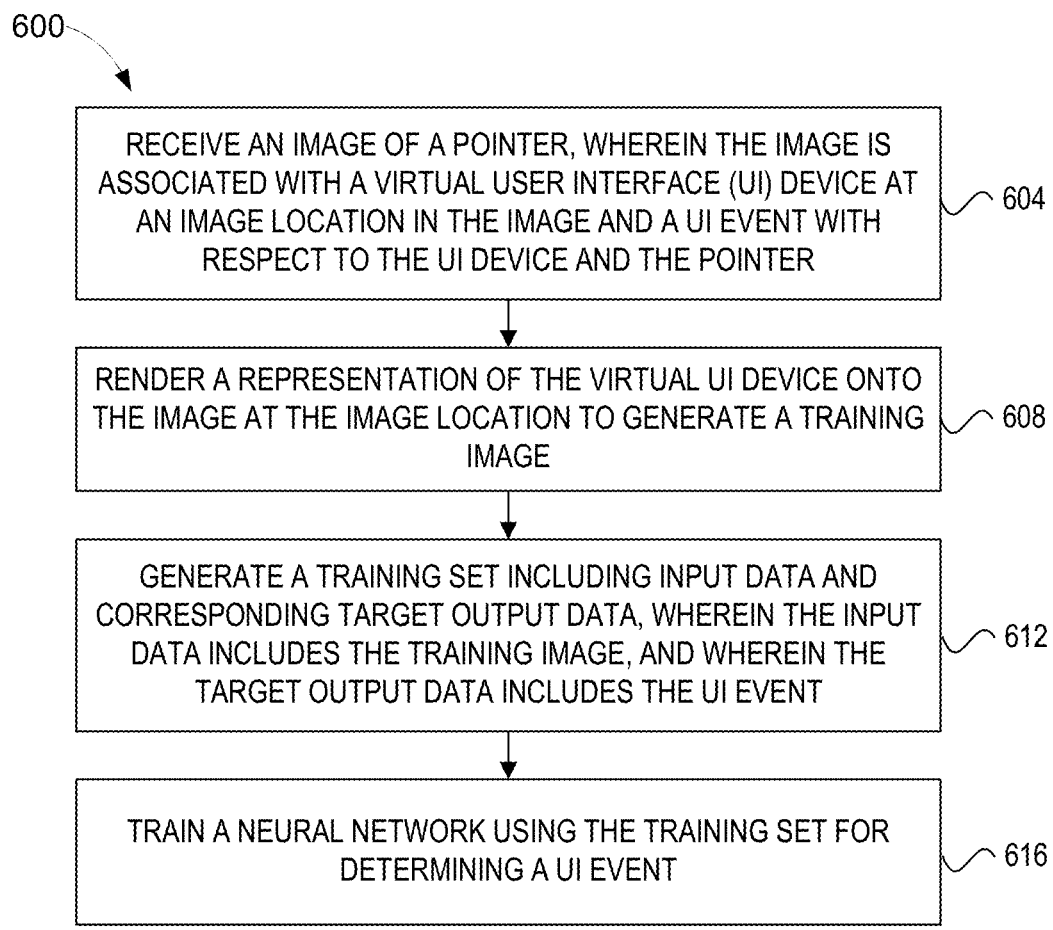
FIG. 6 shows a flow diagram of an illustrative method of training a neural network for determining a user interface event using a representation of a user interface device.

FIG. 6 shows a flow diagram of an illustrative method 600 of training a machine learning model (e.g., a neural network) for determining a user interface event using a representation of a user interface device. At block 604, an image of a pointer can be received. The image can be associated with a virtual user interface (UI) device (e.g., a virtual button) at an image location in the image. The image can be associated with a UI event with respect to the UI device and the pointer (e.g., a button has been pressed).

The UI event can correspond to a state of a plurality of states of the virtual UI device. The plurality of states comprises activation or non-activation of the virtual UI device, such as touching, pressing, releasing, sliding up/down or left/right, moving along a trajectory, or other types of movements. The UI device can be a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof. The UI pointer can be an object associated with a user or a part of the user, such as a pointer, a pen, a pencil, a marker, a highlighter, a finger of the user, or a combination thereof.

At block 608, a representation of the virtual UI device can be rendered onto the image at the image location to generate a training image. This representation of the virtual UI device can be different from the representation of the UI device shown to the user (e.g., a stylized button). In some cases, the representation is a standard representation as described herein. The representation of the virtual UI device rendered onto the image can include a plurality of shapes of high contrasts. In some embodiments, the plurality of shapes of high contrasts includes a plurality of concentric shapes of high contrast. Alternatively, or additionally, the centers of gravity of shapes of the plurality of shapes can be within a threshold distance of each other. The threshold distance can be based on 0, 1, 2, 5, 10, or more pixels or a percentage (e.g., 0%, 0.1%, 1%, 2%, or more) of a size of a shape of the plurality of shapes.

In some embodiments, the plurality of shapes can include a first shape and a second shape that are adjacent each other. For example, the first shape can be within or outside the second shape. The first shape of the plurality of shapes can be associated with a first color (e.g., black or a dark color). The second shape of the plurality of shapes can be associated with a second color (e.g., white or a light color). The second shape can be partially transparent. For example, the second shape can include a first region and a second region. The second region of the second shape can be further away from the first region of the second shape. The first region of the second shape can be associated with a first transparency value (e.g., an alpha transparency value). The second region of the second shape is associated with a second transparency value. The second transparency value can be smaller than the first transparency value. For example, the second region which is further away than the first region can have a larger transparency value and is more transparent. The plurality of shapes of high contrast can include a third shape with a third color (e.g., white or light color). The first shape can be adjacent to the first shape. For example, the third shape can be within or outside the first shape.

At block 612, a training set including input data and corresponding target output data can be generated. The input data can include the training image. The target output data can include the UI event. In some embodiments, the training set can include pairs of stereoscopic images or sets of multiscopic images. For example, a first representation of the virtual UI device can be rendered on a first image of a pair of stereoscopic images. A second representation of the virtual UI device can be rendered on a second image of the pair of stereoscopic images. The two representations can be different, the same, or have different sizes.

At block 616, a neural network (NN) can be trained, using the training set, for determining a UI event. The training set can include monoscopic images, pairs of stereoscopic images, or sets of multiscopic images with representations of UI devices for training the NN. The process of training the NN involves presenting the network with both input data and corresponding target output data of the training set. Through the process of training, the weights of the network can be incrementally or iteratively adapted such that the output of the network, given a particular input data from the training set, comes to match (e.g., as closely as possible) the target output corresponding to that particular input data.

Example Method of User Interface Event Determination

Figure 7:
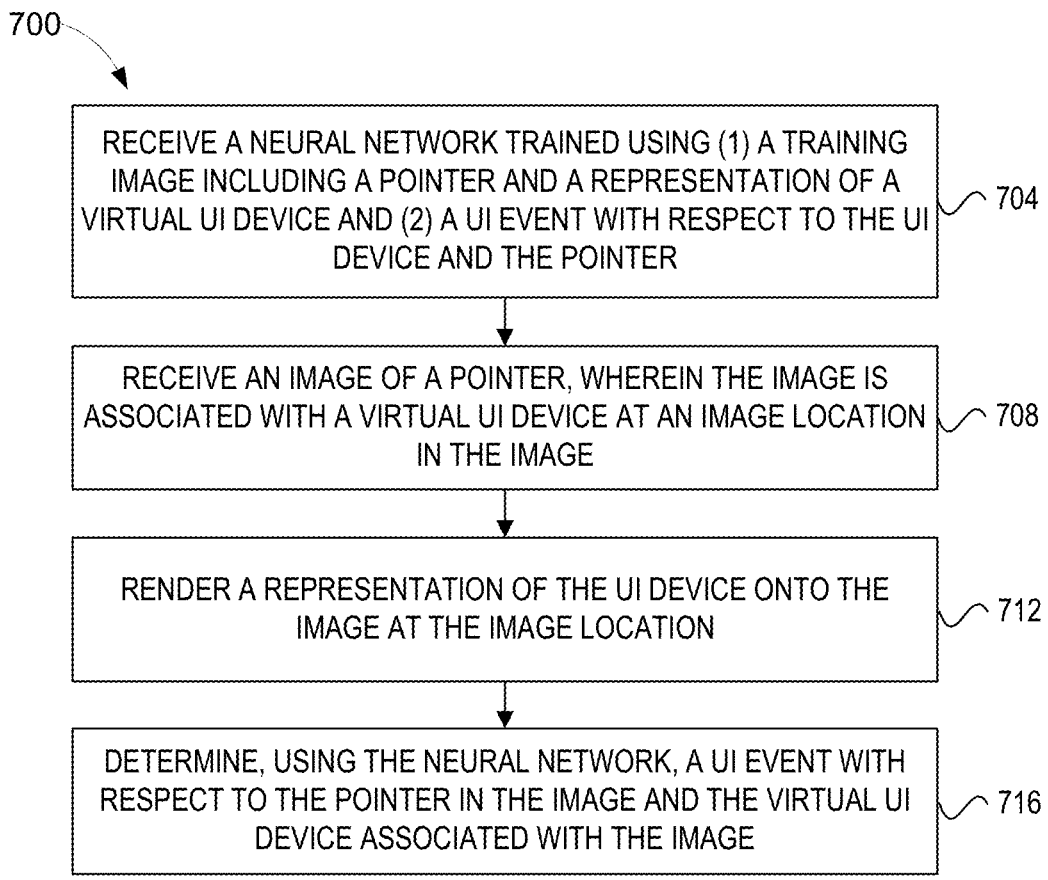
FIG. 7 shows a flow diagram of an illustrative method of using a neural network to determine a user interface event using a representation of a user interface device.

FIG. 7 shows a flow diagram of an illustrative method of using a machine learning model (e.g., a neural network) to determine a user interface event using a representation of a user interface device. A user device, such as a head mountable or wearable ARD or display system, can implement the method 700. At block 704, the ARD can receive a neural network (NN) trained using a training set including a training image. The training image can include a pointer and a representation of a virtual UI device. The training image can be associated with a UI event with respect to the virtual UI device and the pointer. For example, the NN can be the NN trained using the method 600.

At block 708, the ARD can receive an image of a pointer. The image is associated with a virtual UI device at an image location. For example, the image can be captured by a forward-facing imaging system of the ARD when the virtual device is displayed to the user by the ARD. The UI device can be a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof. The UI pointer can be an object associated with a user or a part of the user, such as a pointer, a pen, a pencil, a marker, a highlighter, a finger of the user, or a combination thereof.

At block 712, the ARD can render a representation of the virtual UI device onto the image at the image location associated with the virtual UI device. As described in detail with reference to the method 600, the representation of the virtual UI device can be rendered onto the image at the image location to generate a training image. The representation of the virtual UI device can include a plurality of shapes of high contrasts. In some embodiments, the plurality of shapes of high contrasts includes a plurality of concentric shapes of high contrast. Alternatively, or additionally, the centers of gravity of shapes of the plurality of shapes can be within a threshold distance of each other. In some embodiments, the plurality of shapes can include adjacent shapes of different colors (e.g., black, a dark color, white, or a light color). The representation of the virtual UI device rendered by the ARD at block 712 can be similar or the same as the representation of the UI device rendered at block 608 for generating the training image.

At block 716, the ARD can determine, using the NN, a UI event with respect to the pointer in the image and the virtual UI device associated with the image. The UI event can correspond to a state of a plurality of states of the virtual UI device. The plurality of states comprises activation or nonactivation of the virtual UI device, such as touching, pressing, releasing, sliding up/down or left/right, moving along a trajectory, or other types of movements. Optionally, the ARD can generate a virtual content, virtual image information, or a modified version thereof, based on the UI event determined and cause the virtual content to be provided to a wearer of the ARD via its display. Additionally, or alternatively, the ARD can perform an action based on the UI event. For example, the ARD can cause the TV 104 described with reference to FIG. 1 to be turned on. Descriptions of generating virtual content or performing actions based on UI events are provided in U.S. patent application Ser. No. 15/829,249, filed on Dec. 1, 2017, entitled "VIRTUAL USER INPUT CONTROLS IN A MIXED REALITY ENVIRONMENT," the content of which is hereby incorporated by reference herein in its entirety.

Example Augmented Reality Scenario

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality "VR" scenario typically involves presentation of digital or virtual image information without transparency to other actual real-world visual input; an augmented reality "AR" scenario typically involves presentation of digital or virtual image information as an augmentation to visualization of the actual world around the user; or a mixed reality "MR" scenario that typically involves merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

Figure 8:
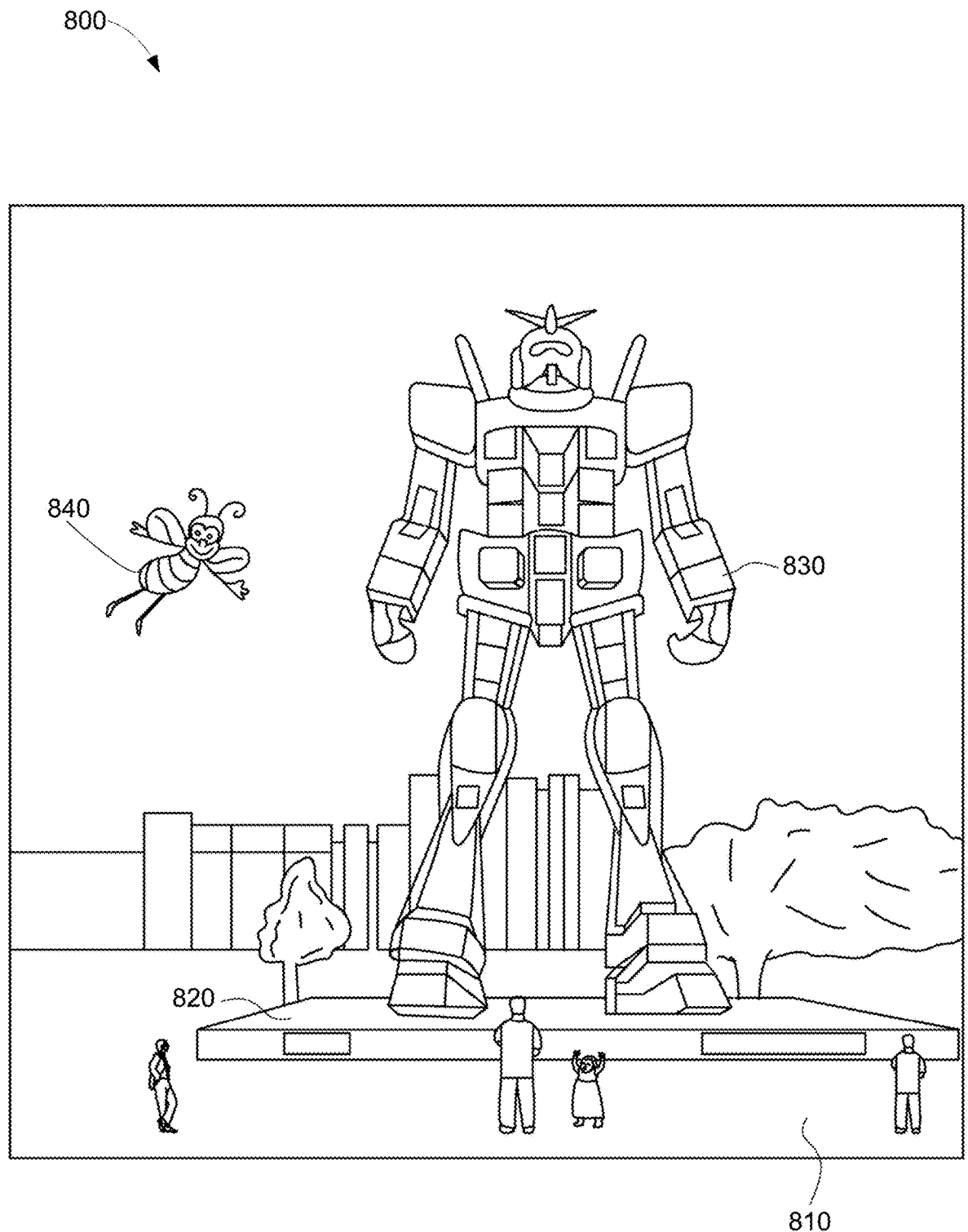
FIG. 8 depicts an illustration of an augmented reality scenario with certain virtual reality objects, and certain actual reality objects viewed by a person, according to one embodiment.

FIG. 8 depicts an illustration of an augmented reality scenario with certain virtual reality objects, and certain actual reality objects viewed by a person. FIG. 8 depicts an augmented reality scene 800, wherein a user of an AR technology sees a real-world park-like setting 810 featuring people, trees, buildings in the background, and a concrete platform 820. In addition to these items, the user of the AR technology also perceives that he "sees" a robot statue 830 standing upon the real-world platform 820, and a cartoon-like avatar character 840 (e.g., a bumble bee) flying by which seems to be a personification of a bumble bee, even though these elements do not exist in the real world.

In order for a three dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth. To produce or enhance VR, AR, and MR experiences, display systems can use biometric information to enhance those experiences.

Example Wearable Display System

FIG. 9 illustrates an example of a wearable display system 900 that can be used to present a VR, AR, or MR experience to a display system wearer or viewer 904. The wearable display system 900 may be programmed to perform any of the applications or embodiments described herein. The display system 900 includes a display 908, and various mechanical and electronic modules and systems to support the functioning of the display 908. The display 908 may be coupled to a frame 912, which is wearable by a display system user, wearer, or viewer 904 and which is configured to position the display 908 in front of the eyes of the wearer 904. The display 908 may be a light field display. In some embodiments, a speaker 916 is coupled to the frame 912 and positioned adjacent the ear canal of the user. In some embodiments, another speaker, not shown, is positioned adjacent the other ear canal of the user to provide for stereo/shapeable sound control. The display 908 is operatively coupled 920, such as by a wired lead or wireless connectivity, to a local data processing module 924 which may be mounted in a variety of configurations, such as fixedly attached to the frame 912, fixedly attached to a helmet or hat worn by the user, embedded in headphones, or otherwise removably attached to the user 904 (e.g., in a backpack-style configuration, in a belt-coupling style configuration).

The frame 912 can have one or more cameras attached or mounted to the frame 912 to obtain images of the wearer's eye(s). In one embodiment, the camera(s) may be mounted to the frame 912 in front of a wearer's eye so that the eye can be imaged directly. In other embodiments, the camera can be mounted along a stem of the frame 912 (e.g., near the wearer's ear). In such embodiments, the display 908 may be coated with a material that reflects light from the wearer's eye back toward the camera. The light may be infrared light, since iris features are prominent in infrared images.

The local processing and data module 924 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 912 or otherwise attached to the user 904), such as image capture devices (such as cameras), microphones, inertial measurement units, accelerometers, compasses, GPS units, radio devices, and/or gyros; and/or (b) acquired and/or processed using remote processing module 928 and/or remote data repository 932, possibly for passage to the display 908 after such processing or retrieval. The local processing and data module 924 may be operatively coupled to the remote processing module 928 and remote data repository 932 by communication links 936 and/or 940, such as via wired or wireless communication links, such that these remote modules 928, 932 are available as resources to the local processing and data module 924. The image capture device(s) can be used to capture the eye images used in the eye image processing procedures. In addition, the remote processing module 928 and remote data repository 932 may be operatively coupled to each other.

In some embodiments, the remote processing module 928 may comprise one or more processors configured to analyze and process data and/or image information such as video information captured by an image capture device. The video data may be stored locally in the local processing and data module 924 and/or in the remote data repository 932. In some embodiments, the remote data repository 932 may comprise a digital data storage facility, which may be available through the internet or other networking configuration in a "cloud" resource configuration. In some embodiments, all data is stored and all computations are performed in the local processing and data module 924, allowing fully autonomous use from a remote module.

In some implementations, the local processing and data module 924 and/or the remote processing module 928 are programmed to perform embodiments of systems and methods as described herein. The image capture device can capture video for a particular application (e.g., video of the wearer's eye for an eye-tracking application or video of a wearer's hand or finger for a gesture identification application). The video can be analyzed by one or both of the processing modules 924, 928. In some cases, off-loading at least some of the iris code generation to a remote processing module (e.g., in the "cloud") may improve efficiency or speed of the computations. The parameters of the systems and methods disclosed herein can be stored in data modules 924 and/or 928.

The results of the analysis can be used by one or both of the processing modules 924, 928 for additional operations or processing. For example, in various applications, biometric identification, eye-tracking, recognition, or classification of gestures, objects, poses, etc. may be used by the wearable display system 900. For example, the wearable display system 900 may analyze video captured of a hand of the wearer 904 and recognize a gesture by the wearer's hand (e.g., picking up a real or virtual object, signaling assent or dissent (e.g., "thumbs up", or "thumbs down"), etc.), and the wearable display system.

In some embodiments, the local processing module 924, the remote processing module 928, and a system on the cloud can perform some or all of the methods disclosed herein. For example, the remote processing module 928 or the system on the cloud can perform the method 600 describe above with reference to FIG. 6 to render a representation of a virtual user interface (UI) device (e.g., a button) onto an image of a pointer (e.g., a stylus) and use the image with the representation of the virtual UI device to train a neural network (NN) for determining a UI event. As another example, the local processing module 924 can perform the method 700 described above with reference to FIG. 7. The local processing module 924 can receive the NN from the remote processing module 928 or the system on the cloud. The local processing module 924 can use the NN to determine a UI event with respect to a pointer in an image and a virtual UI device associated with the image.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 10:
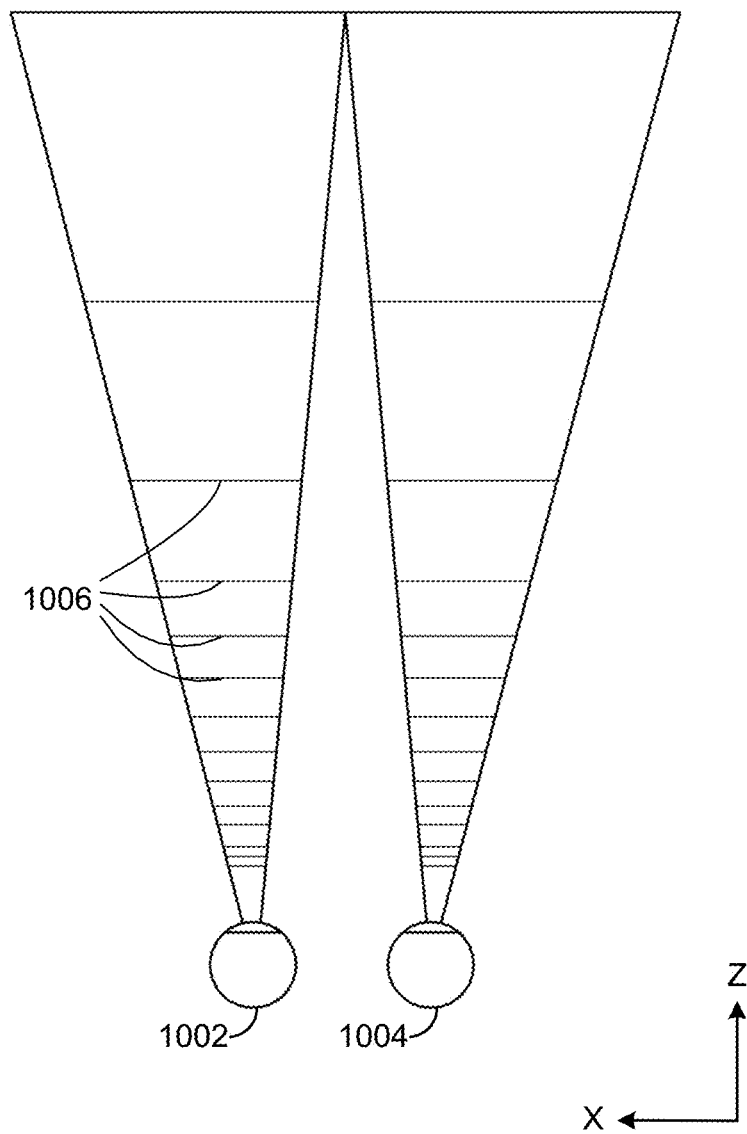
FIG. 10 illustrates aspects of an approach for simulating three-dimensional imagery using multiple depth planes, according to one embodiment.

FIG. 10 illustrates aspects of an approach for simulating three-dimensional imagery using multiple depth planes. With reference to FIG. 10, objects at various distances from eyes 1002 and 1004 on the z-axis are accommodated by the eyes 1002 and 1004 so that those objects are in focus. The eyes 1002 and 1004 assume particular accommodated states to bring into focus objects at different distances along the z-axis. Consequently, a particular accommodated state may be said to be associated with a particular one of depth planes 1006, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 1002 and 1004, and also by providing different presentations of the image corresponding to each of the depth planes. While shown as being separate for clarity of illustration, it will be appreciated that the fields of view of the eyes 1002 and 1004 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Example Waveguide Stack Assembly

Figure 11:
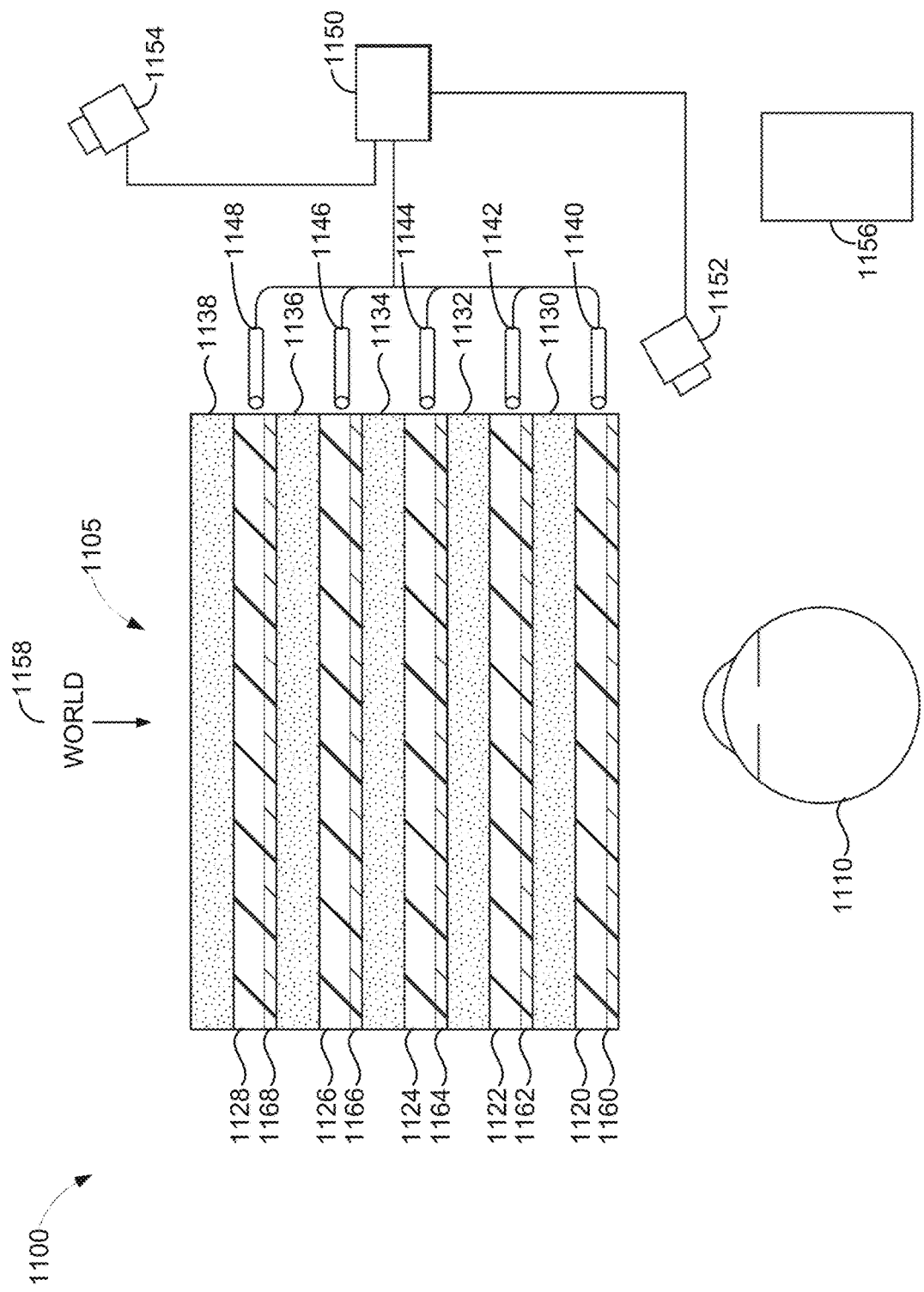
FIG. 11 illustrates an example of a waveguide stack for outputting image information to a user, according to one embodiment.

FIG. 11 illustrates an example of a waveguide stack for outputting image information to a user. A display system 1100 includes a stack of waveguides, or stacked waveguide assembly 1105 that may be utilized to provide three-dimensional perception to the eye 1110 or brain using a plurality of waveguides 1120, 1122, 1124, 1126, 1128. In some embodiments, the display system 1100 may correspond to system 900 of FIG. 9, with FIG. 11 schematically showing some parts of that system 900 in greater detail. For example, in some embodiments, the waveguide assembly 1105 may be integrated into the display 908 of FIG. 9.

With continued reference to FIG. 11, the waveguide assembly 1105 may also include a plurality of features 1130, 1132, 1134, 1136 between the waveguides. In some embodiments, the features 1130, 1132, 1134, 1136 may be lenses. In some embodiments, the features 1130, 1132, 1134, 1136 may not be lenses. Rather, they may be spacers (e.g., cladding layers and/or structures for forming air gaps).

The waveguides 1120, 1122, 1124, 1126, 1128 and/or the plurality of lenses 1130, 1132, 1134, 1136 may be configured to send image information to the eye with various levels of wavefront curvature or light ray divergence. Each waveguide level may be associated with a particular depth plane and may be configured to output image information corresponding to that depth plane. Image injection devices 1140, 1142, 1144, 1146, 1148 may be utilized to inject image information into the waveguides 1120, 1122, 1124, 1126, 1128, each of which may be configured to distribute incoming light across each respective waveguide, for output toward the eye 1110. Light exits an output surface of the image injection devices 1140, 1142, 1144, 1146, 1148 and is injected into a corresponding input edge of the waveguides 1120, 1122, 1124, 1126, 1128. In some embodiments, a single beam of light (e.g., a collimated beam) may be injected into each waveguide to output an entire field of cloned collimated beams that are directed toward the eye 1110 at particular angles (and amounts of divergence) corresponding to the depth plane associated with a particular waveguide.

In some embodiments, the image injection devices 1140, 1142, 1144, 1146, 1142 are discrete displays that each produce image information for injection into a corresponding waveguide 1120, 1122, 1124, 1126, 1128, respectively. In some other embodiments, the image injection devices 1140, 1142, 1146, 1146, 1148 are the output ends of a single multiplexed display which may, for example, pipe image information via one or more optical conduits (such as fiber optic cables) to each of the image injection devices 1140, 1142, 1144, 1146, 1148.

A controller 1150 controls the operation of the stacked waveguide assembly 1105 and the image injection devices 1140, 1142, 1144, 1146, 1148. In some embodiments, the controller 1150 includes programming (e.g., instructions in a non-transitory computer-readable medium) that regulates the timing and provision of image information to the waveguides 1120, 1122, 1124, 1126, 1128. In some embodiments, the controller 1150 may be a single integral device, or a distributed system connected by wired or wireless communication channels. The controller 1150 may be part of the processing modules 924 or 928 (illustrated in FIG. 9) in some embodiments. In some embodiments, the controller may be in communication with an inward-facing imaging system 1152 (e.g., a digital camera), an outward-facing imaging system 1154 (e.g., a digital camera), and/or a user input device 116. The inward-facing imaging system 1152 (e.g., a digital camera) can be used to capture images of the eye 1110 to, for example, determine the size and/or orientation of the pupil of the eye 1110. The outward-facing imaging system 1154 can be used to image a portion of the world 1158. The user can input commands to the controller 1150 via the user input device 1166 to interact with the display system 1100.

The waveguides 1120, 1122, 1124, 1126, 1128 may be configured to propagate light within each respective waveguide by total internal reflection (TIR). The waveguides 1120, 1122, 1124, 1126, 1128 may each be planar or have another shape (e.g., curved), with major top and bottom surfaces and edges extending between those major top and bottom surfaces. In the illustrated configuration, the waveguides 1120, 1122, 1124, 1126, 1128 may each include light extracting optical elements 1160, 1162, 1164, 1166, 1168 that are configured to extract light out of a waveguide by redirecting the light, propagating within each respective waveguide, out of the waveguide to output image information to the eye 1110. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (1160, 1162, 1164, 1166, 1168 may, for example, be reflective and/or diffractive optical features. While illustrated disposed at the bottom major surfaces of the waveguides 1120, 1122, 1124, 1126, 1128 for ease of description and drawing clarity, in some embodiments, the light extracting optical elements 1160, 1162, 1164, 1166, 1168 may be disposed at the top and/or bottom major surfaces, and/or may be disposed directly in the volume of the waveguides 1120, 1122, 1124, 1126, 1128. In some embodiments, the light extracting optical elements 1160, 1162, 1164, 1166, 1168 may be formed in a layer of material that is attached to a transparent substrate to form the waveguides 1120, 1122, 1124, 1126, 1128. In some other embodiments, the waveguides 1120, 1122, 1124, 1126, 1128 may be a monolithic piece of material and the light extracting optical elements 1160, 1162, 1164, 1166, 1168 may be formed on a surface and/or in the interior of that piece of material.

With continued reference to FIG. 11, as discussed herein, each waveguide 1120, 1122, 1124, 1126, 1128 is configured to output light to form an image corresponding to a particular depth plane. For example, the waveguide 1120 nearest the eye may be configured to deliver collimated light, as injected into such waveguide 1120, to the eye 1110. The collimated light may be representative of the optical infinity focal plane. The next waveguide up 1122 may be configured to send out collimated light which passes through the first lens 1130 (e.g., a negative lens) before it can reach the eye 1110. First lens 1130 may be configured to create a slight convex wavefront curvature so that the eye/brain interprets light coming from that next waveguide up 1122 as coming from a first focal plane closer inward toward the eye 1110 from optical infinity. Similarly, the third up waveguide 1124 passes its output light through both the first lens 1130 and second lens 1132 before reaching the eye 1110. The combined optical power of the first and second lenses 1130 and 1132 may be configured to create another incremental amount of wavefront curvature so that the eye/brain interprets light coming from the third waveguide 1124 as coming from a second focal plane that is even closer inward toward the person from optical infinity than is light from the next waveguide up 1122.

The other waveguide layers (e.g., waveguides 1126, 1128) and lenses (e.g., lenses 1134, 1136) are similarly configured, with the highest waveguide 1128 in the stack sending its output through all of the lenses between it and the eye for an aggregate focal power representative of the closest focal plane to the person. To compensate for the stack of lenses 1130, 1132, 1134, 1136 when viewing/interpreting light coming from the world 1158 on the other side of the stacked waveguide assembly 1105, a compensating lens layer 1138 may be disposed at the top of the stack to compensate for the aggregate power of the lens stack 1130, 1132, 1134, 1136 below. Such a configuration provides as many perceived focal planes as there are available waveguide/lens pairings. Both the light extracting optical elements 1160, 1162, 1164, 1166, 1168 of the waveguides 1120, 1122, 1124, 1126, 1128 and the focusing aspects of the lenses 1130, 1132, 1134, 1136 may be static (e.g., not dynamic or electro-active). In some alternative embodiments, either or both may be dynamic using electro-active features.

With continued reference to FIG. 11, the light extracting optical elements 1160, 1162, 1164, 1166, 1168 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 1160, 1162, 1164, 1166, 1168 may be volumetric or surface features, which may be configured to output light at specific angles. For example, the light extracting optical elements 1160, 1162, 1164, 1166, 1168 may be volume holograms, surface holograms, and/or diffraction gratings. Light extracting optical elements, such as diffraction gratings, are described in U.S. Patent Publication No. 2015/0178939, published Jun. 25, 2015, which is hereby incorporated by reference herein in its entirety. In some embodiments, the features 1130, 1132, 1134, 1136, 1138 may not be lenses. Rather, they may simply be spacers (e.g., cladding layers and/or structures for forming air gaps).

In some embodiments, the light extracting optical elements 1160, 1162, 1164, 1166, 1168 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 1110 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 1110 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 1152 (e.g., a digital camera) may be used to capture images of the eye 1110 to determine the size and/or orientation of the pupil of the eye 1110. In some embodiments, the inward-facing imaging system 1152 may be attached to the frame 912 (as illustrated in FIG. 9) and may be in electrical communication with the processing modules 924 and/or 928, which may process image information from the inward-facing imaging system 1152) to determine, e.g., the pupil diameters, or orientations of the eyes of the user 904.

In some embodiments, the inward-facing imaging system 1152 (e.g., a digital camera) can observe the movements of the user, such as the eye movements and the facial movements. The inward-facing imaging system 1152 may be used to capture images of the eye 1110 to determine the size and/or orientation of the pupil of the eye 1110. The inward-facing imaging system 1152 can be used to obtain images for use in determining the direction the user is looking (e.g., eye pose) or for biometric identification of the user (e.g., via iris identification). The images obtained by the inward-facing imaging system 1152 may be analyzed to determine the user's eye pose and/or mood, which can be used by the display system 1100 to decide which audio or visual content should be presented to the user. The display system 1100 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 1110 (e.g., using only a single camera per pair of eyes) is determined and assumed to be similar for both eyes of the viewer 904.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 1150 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 1100 can include an outward-facing imaging system 1154 (e.g., a digital camera) that images a portion of the world 1158. This portion of the world 1158 may be referred to as the field of view (FOV) and the imaging system 1154 is sometimes referred to as an FOV camera. The entire region available for viewing or imaging by a viewer 904 may be referred to as the field of regard (FOR). The FOR may include $4\pi$ steradians of solid angle surrounding the display system 1100. In some implementations of the display system 1100, the FOR may include substantially all of the solid angle around a user 904 of the display system 1100, because the user 904 can move their head and eyes to look at objects surrounding the user (in front, in back, above, below, or on the sides of the user). Images obtained from the outward-facing imaging system 1154 can be used to track gestures made by the user (e.g., hand or finger gestures), detect objects in the world 1158 in front of the user, and so forth.

The object recognitions or detections may be performed using a variety of computer vision techniques. For example, the wearable system can analyze the images acquired by the outward-facing imaging system 1154 (described with reference to FIG. 11) to perform scene reconstruction, event detection, video tracking, object recognition (e.g., persons or documents), gesture detection or recognition, object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. The local processing and data module 924 and/or the remote processing module 928 and remote data repository 932 can be programmed with object recognizers that crawl the images and perform the computer vision algorithms on the images. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions or detections can additionally or alternatively be performed by a variety of machine learning algorithms. Once trained, the machine learning algorithm can be stored by the ARD (e.g., the local processing and data module 924 and/or the remote processing module 928 and remote data repository 932). Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using predefined thresholds or data values.

The display system 1100 can include a user input device 1156 by which the user can input commands to the controller 1150 to interact with the display system 400. For example, the user input device 1156 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 1100 (e.g., to provide user input to a user interface provided by the display system 1100). The user input device 1156 may be held by the user's hand during the use of the display system 1100. The user input device 1156 can be in wired or wireless communication with the display system 1100.

Figure 12:
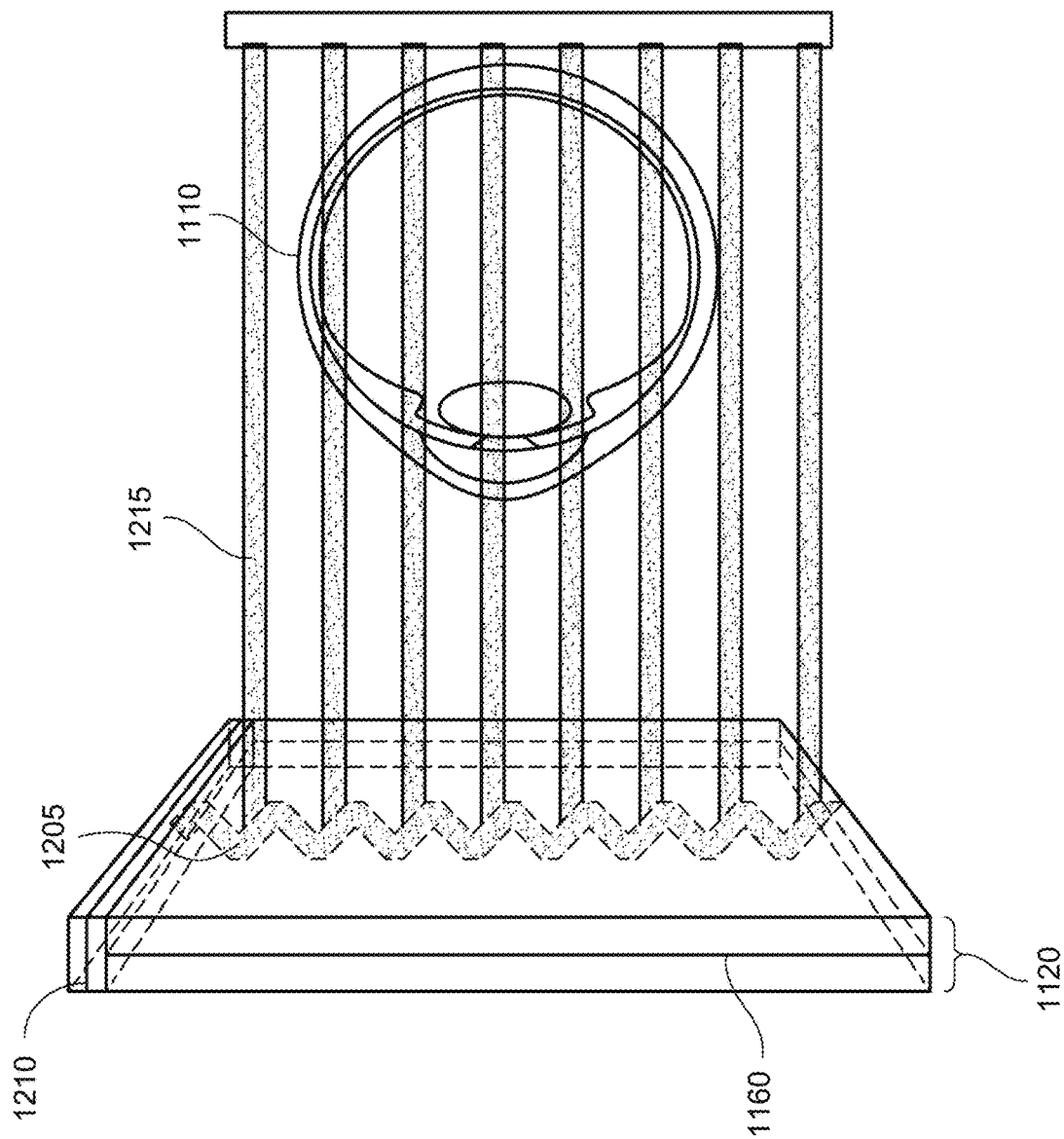
FIG. 12 shows example exit beams that may be outputted by a waveguide, according to one embodiment.

FIG. 12 shows an example of exit beams outputted by a waveguide. One waveguide is illustrated, but it will be appreciated that other waveguides in the waveguide assembly 1105 may function similarly, where the waveguide assembly 1105 includes multiple waveguides. Light 1205 is injected into the waveguide 1120 at the input edge 1210 of the waveguide 1120 and propagates within the waveguide 1120 by total internal reflection (TIR). At points where the light 1205 impinges on the diffractive optical element (DOE) 1160, a portion of the light exits the waveguide as exit beams 1215. The exit beams 1215 are illustrated as substantially parallel but they may also be redirected to propagate to the eye 1110 at an angle (e.g., forming divergent exit beams), depending on the depth plane associated with the waveguide 1120. It will be appreciated that substantially parallel exit beams may be indicative of a waveguide with light extracting optical elements that outcouple light to form images that appear to be set on a depth plane at a large distance (e.g., optical infinity) from the eye 1110. Other waveguides or other sets of light extracting optical elements may output an exit beam pattern that is more divergent, which would require the eye 1110 to accommodate to a closer distance to bring it into focus on the retina and would be interpreted by the brain as light from a distance closer to the eye 1110 than optical infinity.

Figure 13:
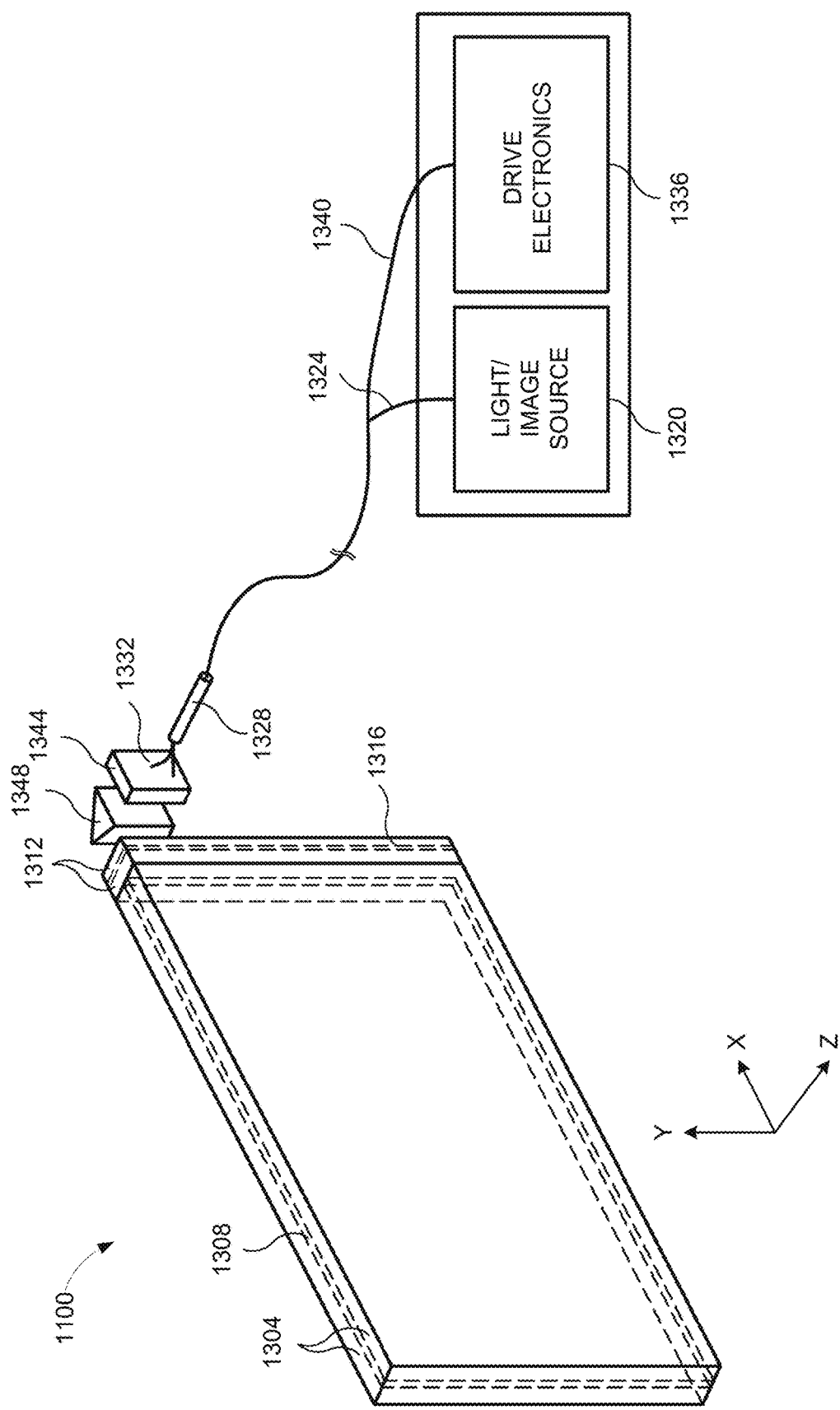
FIG. 13 is a schematic diagram showing a display system, according to one embodiment.

FIG. 13 shows another example of the display system 1100 including a waveguide apparatus, an optical coupler subsystem to optically couple light to or from the waveguide apparatus, and a control subsystem. The display system 1100 can be used to generate a multi-focal volumetric, image, or light field. The display system 1100 can include one or more primary planar waveguides 1304 (only one is shown in FIG. 13) and one or more DOEs 1308 associated with each of at least some of the primary waveguides 1304. The planar waveguides 1304 can be similar to the waveguides 1120, 1122, 1124, 1126, 1128 discussed with reference to FIG. 11. The optical system may employ a distribution waveguide apparatus, to relay light along a first axis (vertical or Y-axis in view of FIG. 13), and expand the light's effective exit pupil along the first axis (e.g., Y-axis). The distribution waveguide apparatus, may, for example include a distribution planar waveguide 1312 and at least one DOE 1316 (illustrated by double dash-dot line) associated with the distribution planar waveguide 1312. The distribution planar waveguide 1312 may be similar or identical in at least some respects to the primary planar waveguide 1304, having a different orientation therefrom. Likewise, the at least one DOE 1316 may be similar or identical in at least some respects to the DOE 1308. For example, the distribution planar waveguide 1312 and/or DOE 1316 may be comprised of the same materials as the primary planar waveguide 1304 and/or DOE 1308, respectively. The optical system shown in FIG. 13 can be integrated into the wearable display system 900 shown in FIG. 9.

The relayed and exit-pupil expanded light is optically coupled from the distribution waveguide apparatus into the one or more primary planar waveguides 1304. The primary planar waveguide 1304 relays light along a second axis, preferably orthogonal to first axis, (e.g., horizontal or X-axis in view of FIG. 13). Notably, the second axis can be a non-orthogonal axis to the first axis. The primary planar waveguide 1304 expands the light's effective exit path along that second axis (e.g., X-axis). For example, the distribution planar waveguide 1312 can relay and expand light along the vertical or Y-axis, and pass that light to the primary planar waveguide 1304 which relays and expands light along the horizontal or X-axis.

The display system 1100 may include one or more sources of colored light (e.g., red, green, and blue laser light) 1320 which may be optically coupled into a proximal end of a single mode optical fiber 1324. A distal end of the optical fiber 1324 may be threaded or received through a hollow tube 1328 of piezoelectric material. The distal end protrudes from the tube 1328 as fixed-free flexible cantilever 1332. The piezoelectric tube 1328 can be associated with four quadrant electrodes (not illustrated). The electrodes may, for example, be plated on the outside, outer surface or outer periphery or diameter of the tube 1328. A core electrode (not illustrated) is also located in a core, center, inner periphery or inner diameter of the tube 1328.

Drive electronics 1336, for example electrically coupled via wires 1340, drive opposing pairs of electrodes to bend the piezoelectric tube 1328 in two axes independently. The protruding distal tip of the optical fiber 1324 has mechanical modes of resonance. The frequencies of resonance can depend upon a diameter, length, and material properties of the optical fiber 1324. By vibrating the piezoelectric tube 1328 near a first mode of mechanical resonance of the fiber cantilever 1332, the fiber cantilever 1332 is caused to vibrate, and can sweep through large deflections.

By stimulating resonant vibration in two axes, the tip of the fiber cantilever 1332 is scanned biaxially in an area filling two dimensional (2-D) scan. By modulating an intensity of light source(s) 1320 in synchrony with the scan of the fiber cantilever 1332, light emerging from the fiber cantilever 1332 forms an image. Descriptions of such a set up are provided in U.S. Patent Publication No. 2014/0003762, which is incorporated by reference herein in its entirety.

A component 1344 of an optical coupler subsystem collimates the light emerging from the scanning fiber cantilever 1332. The collimated light is reflected by mirrored surface 1348 into the narrow distribution planar waveguide 1312 which contains the at least one diffractive optical element (DOE) 1316. The collimated light propagates vertically (relative to the view of FIG. 13) along the distribution planar waveguide 1312 by total internal reflection, and in doing so repeatedly intersects with the DOE 1316. The DOE 1316 preferably has a low diffraction efficiency. This causes a fraction (e.g., 10%) of the light to be diffracted toward an edge of the larger primary planar waveguide 1304 at each point of intersection with the DOE 1316, and a fraction of the light to continue on its original trajectory down the length of the distribution planar waveguide 1312 via TIR.

At each point of intersection with the DOE 1316, additional light is diffracted toward the entrance of the primary waveguide 1312. By dividing the incoming light into multiple outcoupled sets, the exit pupil of the light is expanded vertically by the DOE 1316 in the distribution planar waveguide 1312. This vertically expanded light coupled out of distribution planar waveguide 1312 enters the edge of the primary planar waveguide 1304.

Light entering primary waveguide 1304 propagates horizontally (relative to the view of FIG. 13) along the primary waveguide 1304 via TIR. As the light intersects with DOE 1308 at multiple points as it propagates horizontally along at least a portion of the length of the primary waveguide 1304 via TIR. The DOE 1308 may advantageously be designed or configured to have a phase profile that is a summation of a linear diffraction pattern and a radially symmetric diffractive pattern, to produce both deflection and focusing of the light. The DOE 1308 may advantageously have a low diffraction efficiency (e.g., 10%), so that only a portion of the light of the beam is deflected toward the eye of the view with each intersection of the DOE 1308 while the rest of the light continues to propagate through the waveguide 1304 via TIR.

At each point of intersection between the propagating light and the DOE 1308, a fraction of the light is diffracted toward the adjacent face of the primary waveguide 1304 allowing the light to escape the TIR, and emerge from the face of the primary waveguide 1304. In some embodiments, the radially symmetric diffraction pattern of the DOE 1308 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1304 by a multiplicity of DOEs 1308 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Additional Aspects

Examples of a Wearable Display System Using a Trained Neural Network to Determine a UI Event In a 1st aspect, a wearable display system is disclosed. The wearable display system comprises: an image capture device configured to capture an image comprising a pointer; non-transitory computer-readable storage medium configured to store: the image, a virtual user interface (UI) device associated with the image at an image location on the image, and a neural network for determining a UI event trained using: a training image associated with a training virtual UI device, the training image comprising a representation of the training virtual UI device and a training pointer, and a training UI event with respect to the training virtual UI device and the training pointer in the training image; a display configured to display the virtual UI device at a display location when the image is captured by the image capture device, wherein the image location is related to the display location; and a hardware processor in communication with the image capture device, the display, and the non-transitory computer-readable storage medium, the processor programmed by the executable instructions to: receive the image from the image capture device; render a representation of the virtual UI device onto the image at the image location; and determine, using the neural network, a UI event with respect to the pointer in the image and the virtual UI device associated with the image. The processor can generate virtual content based on the UI event, and cause the display to present the virtual content to the wearer of the wearable display system.

In a 2nd aspect, the wearable display system of aspect 1, wherein the processor is further programmed to generate virtual content (or virtual image information) based on the UI event; and cause the display to provide the virtual content to the wearer of the wearable display system.

In a 3rd aspect, the wearable display system of any one of aspects 1-2, wherein the processor is further programmed to perform an action (e.g., activation of another device, such as a TV, a car, etc., or connecting with another device, such as a phone, a mobile device, an ARD, etc.) based on the UI event.

In a 4th aspect, the wearable display system of any one of aspects 1-3, wherein the representation of the virtual UI device comprises a plurality of shapes of high contrasts.

In a 5th aspect, the wearable display system of aspect 4, wherein the plurality of shapes of high contrasts comprises a plurality of concentric shapes of high contrast.

In a 6th aspect, the wearable display system of any one of aspects 4-5, wherein the centers of gravity of shapes of the plurality of shapes are within a threshold distance of each other.

In a 7th aspect, the wearable display system of aspect 6, wherein the threshold distance is 0.

In a 8th aspect, the wearable display system of any one of aspects 4-7, wherein a first shape of the plurality of shapes is associated with a first color, wherein a second shape of the plurality of shapes is associated with a second color, and wherein the first shape is adjacent to the second shape.

In a 9th aspect, the wearable display system of aspect 8, wherein the first color is black, and wherein the second color is white.

In a 10th aspect, the wearable display system of any one of aspects 8-9, wherein the second shape is partially transparent.

In a 11th aspect, the wearable display system of aspect 10, wherein a first region of the second shape is associated with a first transparency value, and wherein a second region of the second shape is associated with a second transparency value.

In a 12th aspect, the wearable display system of aspect 11, wherein the second region of the second shape is further away from the first region of the second shape, and wherein the second transparency value is smaller than the first transparency value.

In a 13th aspect, the wearable display system of any one of aspects 8-12, wherein the second shape is within the first shape.

In a 14th aspect, the wearable display system of any one of aspects 8-13, wherein a third shape of the plurality of shapes is associated with a third color, and wherein the first shape is adjacent to the first shape.

In a 15th aspect, the wearable display system of aspect 14, wherein third color is white.

In a 16th aspect, the wearable display system of any one of aspects 14-15, wherein first shape is within the third shape.

In a 17th aspect, the wearable display system of any one of aspects 1-16, wherein the UI event corresponds to a state of a plurality of states of the virtual UI device.

In a 18th aspect, the wearable display system of aspect 17, wherein the plurality of states comprises activation or non-activation of the virtual UI device.

In a 19th aspect, the wearable display system of any one of aspects 1-18, wherein the virtual UI device is selected from a group comprising of: a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

In a 20th aspect, the wearable display system of any one of aspects 1-19, wherein the UI pointer comprises an object associated with a user or a part of the user.

In a 21st aspect, the wearable display system of aspect 20, wherein the object associated with the user comprises a pointer, a pen, a pencil, a marker, a highlighter, or a combination thereof, and wherein the part of the user comprises a finger of the user.

Examples of a Computer System for Generating Training Data for Training a Machine Learning Model (e.g., a Neural Network)

In a 22nd aspect, a system for training a neural network for determining a user interface event is disclosed. The system comprises: computer-readable memory storing executable instructions; and one or more processors programmed by the executable instructions to at least: receive a plurality of images, wherein an image of the plurality of images comprises a pointer of a plurality of pointers, wherein the image is associated with a virtual user interface (UI) device of a plurality of virtual UI devices at an image location on the image, and wherein the image is associated with a UI event of a plurality of UI events with respect to the virtual UI device and the pointer in the image; render a representation of the virtual UI device onto the image at the image location to generate a training image; and generate a training set comprising input data and corresponding target output data, wherein the input data comprises the training image, and wherein the corresponding target output data comprises the UI event.

In a 23rd aspect, the system of aspect 22, wherein the one or more processors is further programmed to train a machine learning model (e.g., a neural network), for determining a UI event associated with the virtual UI device and the pointer, using the training set.

In a 24th aspect, the system of any one of aspects 22-23, wherein the representation of the virtual UI device comprises a plurality of shapes of high contrasts.

In a 25th aspect, the system of aspect 24, wherein the plurality of shapes of high contrasts comprises a plurality of concentric shapes of high contrast.

In a 26th aspect, the system of any one of aspects 24-25, wherein the centers of gravity of shapes of the plurality of shapes are within a threshold distance of each other.

In a 27th aspect, the system of aspect 26, wherein the threshold distance is 0.

In a 28th aspect, the system of any one of aspects 24-27, wherein a first shape of the plurality of shapes is associated with a first color, wherein a second shape of the plurality of shapes is associated with a second color, and wherein the first shape is adjacent to the second shape.

In a 29th aspect, the system of aspect 28, wherein the first color is black, and wherein the second color is white.

In a 30th aspect, the system of any one of aspects 28-29, wherein the second shape is partially transparent.

In a 31st aspect, the system of aspect 30, wherein a first region of the second shape is associated with a first transparency value, and wherein a second region of the second shape is associated with a second transparency value.

In a 32nd aspect, the system of aspect 31, wherein the second region of the second shape is further away from the first region of the second shape, and wherein the second transparency value is smaller than the first transparency value.

In a 33rd aspect, the system of any one of aspects 28-32, wherein the second shape is within the first shape.

In a 34th aspect, the system of any one of aspects 28-33, wherein a third shape of the plurality of shapes has a third color, and wherein the first shape is adjacent to the first shape.

In a 35th aspect, the system of aspect 34, wherein third color is white.

In a 36th aspect, the system of any one of aspects 34-35, wherein first shape is within the third shape.

In a 37th aspect, the system of any one of aspects 22-36, wherein the UI event corresponds to a state of a plurality of states of the virtual UI device.

In a 38th aspect, the system of aspect 37, wherein the plurality of states comprises activation or non-activation of the virtual UI device.

In a 39th aspect, the system of any one of aspects 22-38, wherein the plurality of virtual UI devices comprises a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

In a 40th aspect, the system of any one of aspects 22-39, wherein the plurality of UI pointers comprises an object associated with a user or a part of the user.

In a 41st aspect, the system of aspect 40, wherein the object associated with the user comprises a pointer, a pen, a pencil, a marker, a highlighter, or a combination thereof, and wherein the part of the user comprises a finger of the user.

Examples of a Method of Using a Trained Neural Network to Determine a UI Event

In a 42nd aspect, a method for using a neural network to determine a UI event is disclosed. The method is under control of a hardware processor and comprises: accessing a neural network for determining a UI event trained using: a training image associated with a training virtual UI device, the training image comprising a representation of the training virtual UI device and a training pointer, and a training UI event with respect to the training virtual UI device and the training pointer in the training image; receiving an image comprising a pointer, wherein a virtual user interface (UI) device is associated with the image at an image location on the image, wherein the virtual UI device is displayed at a display location (e.g., at a display location on an ARD display) when the image is captured (e.g., captured by an image capture device of an ARD), and wherein the image location is related to the display location; receiving the image from the image capture device; rendering a representation of the virtual UI device onto the image at the image location; and determining, using the neural network, a UI event with respect to the pointer in the image and the virtual UI device associated with the image.

In a 43rd aspect, the method of aspect 42, further comprising: generating virtual content (or virtual image information) based on the UI event; and optionally causing the virtual content to be displayed.

In a 44th aspect, the method of any one of aspects 42-43, further comprising: performing an action (e.g., activation of another device, such as a TV, a car, etc., or connecting with another device, such as a phone, a mobile device, an ARD, etc.) based on the UI event.

In a 45th aspect, the method of any one of aspects 42-44, wherein the representation of the virtual UI device comprises a plurality of shapes of high contrasts.

In a 46th aspect, the method of aspect 45, wherein the plurality of shapes of high contrasts comprises a plurality of concentric shapes of high contrast.

In a 47th aspect, the method of any one of aspects 45-46, wherein the centers of gravity of shapes of the plurality of shapes are within a threshold distance of each other.

In a 48th aspect, the method of aspect 47, wherein the threshold distance is 0.

In a 49th aspect, the method of any one of aspects 45-48, wherein a first shape of the plurality of shapes is associated with a first color, wherein a second shape of the plurality of shapes is associated with a second color, and wherein the first shape is adjacent to the second shape.

In a 50th aspect, the method of aspect 49, wherein the first color is black, and wherein the second color is white.

In a 51st aspect, the method of any one of aspects 49-50, wherein the second shape is partially transparent.

In a 52nd aspect, the method of aspect 51, wherein a first region of the second shape is associated with a first transparency value, and wherein a second region of the second shape is associated with a second transparency value.

In a 53rd aspect, the method of aspect 52, wherein the second region of the second shape is further away from the first region of the second shape, and wherein the second transparency value is smaller than the first transparency value.

In a 54th aspect, the method of any one of aspects 49-53, wherein the second shape is within the first shape.

In a 55th aspect, the method of any one of aspects 49-54, wherein a third shape of the plurality of shapes is associated with a third color, and wherein the first shape is adjacent to the first shape.

In a 56th aspect, the method of aspect 55, wherein third color is white.

In a 57th aspect, the method of any one of aspects 55-56, wherein first shape is within the third shape.

In a 58th aspect, the method of any one of aspects 42-57, wherein the UI event corresponds to a state of a plurality of states of the virtual UI device.

In a 59th aspect, the method of aspect 58, wherein the plurality of states comprises activation or non-activation of the virtual UI device.

In a 60th aspect, the method of any one of aspects 42-59, wherein the virtual UI device is selected from a group comprising of: a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

In a 61st aspect, the method of any one of aspects 42-60, wherein the UI pointer comprises an object associated with a user or a part of the user.

In a 62nd aspect, the method of aspect 61, wherein the object associated with the user comprises a pointer, a pen, a pencil, a marker, a highlighter, or a combination thereof, and wherein the part of the user comprises a finger of the user.

Examples of a Method for Training a Machine Learning Model (e.g., Neural Network)

In a 63rd aspect, a method for training a neural network for determining a user interface event is disclosed. The method is under control of a hardware processor and comprises: receiving a plurality of images, wherein a first image of the plurality of images comprises a first representation of a pointer of a plurality of pointers, wherein the first image is associated with a first representation of a virtual user interface (UI) device of a plurality of virtual UI devices at a first image location in the first image, and wherein the first image is associated with a UI event of a plurality of UI events with respect to the virtual UI device and the pointer in the first image; rendering a first representation of the virtual UI device onto the first image at the first image location to generate a first training image; generating a training set comprising input data and corresponding target output data, wherein the input data comprises the first training image, and wherein the corresponding target output data comprises the UI event; and training a neural network, for determining a UI event associated with the virtual UI device and the pointer, using the training set.

In a 64th aspect, the method of aspect 63, wherein a second image of the plurality of images comprises a second representation of the pointer, wherein the second image is associated with a second representation of the virtual UI device at a second image location in the second image, and wherein the second image is associated with the UI event.

In a 65th aspect, the method of aspect 64, wherein the first image and the second image form a stereoscopic pair.

In a 66th aspect, the method of aspect 64, wherein the first image and the second image are images of a multiscopic set of images.

In a 67th aspect, the method of any one of aspects 64-66, further comprising: rendering a second representation of the virtual UI device onto the second image at the second image location to generate a second training image, wherein the input data comprises the second training image.

In a 68th aspect, the method of any one of aspects 63-67, wherein the first representation of the virtual UI device comprises a plurality of shapes of high contrasts.

In a 69th aspect, the method of aspect 68, wherein the plurality of shapes of high contrasts comprises a plurality of concentric shapes of high contrast.

In a 70th aspect, the method of any one of aspects 68-69, wherein the centers of gravity of shapes of the plurality of shapes are within a threshold distance of each other.

In a 71st aspect, the method of aspect 70, wherein the threshold distance is 0.

In a 72nd aspect, the method of any one of aspects 68-71, wherein a first shape of the plurality of shapes is associated with a first color, wherein a second shape of the plurality of shapes is associated with a second color, and wherein the first shape is adjacent to the second shape.

In a 73rd aspect, the method of aspect 72, wherein the first color is black, and wherein the second color is white.

In a 74th aspect, the method of any one of aspects 72-73, wherein the second shape is partially transparent.

In a 75th aspect, the method of aspect 74, wherein a first region of the second shape is associated with a first transparency value, and wherein a second region of the second shape is associated with a second transparency value.

In a 76th aspect, the method of aspect 75, wherein the second region of the second shape is further away from the first region of the second shape, and wherein the second transparency value is smaller than the first transparency value.

In a 77th aspect, the method of any one of aspects 75-76, wherein the second shape is within the first shape.

In a 78th aspect, the method of any one of aspects 75-77, wherein a third shape of the concentric shapes has a third color, and wherein the first shape is adjacent to the first shape.

In a 79th aspect, the method of aspect 78, wherein third color is white.

In a 80th aspect, the method of any one of aspects 78-79, wherein first shape is within the third shape.

In a 81st aspect, the method of any one of aspects 63-80, wherein the UI event corresponds to a state of a plurality of states of the virtual UI device.

In a 82nd aspect, the method of aspect 81, wherein the plurality of states comprises activation or non-activation of the virtual UI device.

In a 83rd aspect, the method of any one of aspects 63-82, wherein the plurality of virtual UI devices comprises a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

In a 84th aspect, the method of any one of aspects 63-83, wherein the plurality of UI pointers comprises an object associated with a user or a part of the user.

In a 85th aspect, the method of aspect 84, wherein the object associated with the user comprises a pointer, a pen, a pencil, a marker, a highlighter, or a combination thereof, and wherein the part of the user comprises a finger of the user.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Additionally, training and executing a neural network can be computationally challenging. In some cases, the neural network is executed by one or more graphics processing units (GPUs).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display system comprising:
an image capture device configured to capture an image comprising a pointer;
non-transitory computer-readable storage medium configured to store:
the image,
a virtual user interface (UI) device associated with the image at an image location on the image, and a neural network for determining a UI event trained using:
an augmented training image associated with the virtual UI device, the augmented training image comprising a representation of the virtual UI device and a representation of a real-world pointer, and
a UI event with respect to the virtual UI device and the real-world pointer in the augmented training image;
a display configured to display the virtual UI device at a display location when the image is captured by the image capture device; and
a hardware processor in communication with the image capture device, the display, and the non-transitory computer-readable storage medium, the processor programmed by executable instructions to:
access the image captured by the image capture device;
render a representation of the virtual UI device onto the image at the image location;
determine, using the neural network, a UI event with respect to the pointer in the image and the virtual UI device associated with the image;
generate virtual content based on the UI event; and
cause the display to present the virtual content.

2. The wearable display system of claim 1, wherein the representation of the virtual UI device comprises a plurality of shapes of high contrasts.

3. The wearable display system of claim 2, wherein the plurality of shapes of high contrasts comprises a plurality of concentric shapes of high contrast.

4. The wearable display system of claim 2, wherein the centers of gravity of shapes of the plurality of shapes are within a threshold distance of each other.

5. The wearable display system of claim 4, wherein the threshold distance is 0.

6. The wearable display system of claim 2,
wherein a first shape of the plurality of shapes is associated with a first color,
wherein a second shape of the plurality of shapes is associated with a second color, and
wherein the first shape is adjacent to the second shape.

7. The wearable display system of claim 6, wherein the first color is black, and wherein the second color is white.

8. The wearable display system of claim 6, wherein the second shape is partially transparent.

9. The wearable display system of claim 8,
wherein a first region of the second shape is associated with a first transparency value, and
wherein a second region of the second shape is associated with a second transparency value.

10. The wearable display system of claim 9,
wherein the second region of the second shape is further away from the first region of the second shape, and
wherein the second transparency value is smaller than the first transparency value.

11. The wearable display system of claim 6, wherein the second shape is within the first shape.

12. The wearable display system of claim 6,
wherein a third shape of the plurality of shapes is associated with a third color, and
wherein the first shape is adjacent to the first shape.

13. The wearable display system of claim 12, wherein third color is white.

14. The wearable display system of claim 12, wherein the first shape is within the third shape.

15. The wearable display system of claim 1, wherein the UI event corresponds to a state of a plurality of states of the virtual UI device.

16. The wearable display system of claim 15, wherein the plurality of states comprises activation or non-activation of the virtual UI device.

17. The wearable display system of claim 1, wherein the virtual UI device is selected from a group comprising of: a button, an updown, a spinner, a picker, a radio button, a radio button list, a checkbox, a picture box, a checkbox list, a dropdown list, a dropdown menu, a selection list, a list box, a combo box, a textbox, a slider, a link, a keyboard key, a switch, a slider, a touch surface, or a combination thereof.

18. The wearable display system of claim 1, wherein the pointer comprises an object associated with a user or a part of the user.

19. The wearable display system of claim 18,
wherein the object associated with the user comprises a stylus, a pen, a pencil, a marker, a highlighter, or a combination thereof, and
wherein the part of the user comprises a finger of the user.

20. A computerized method, performed by a computing system having one or more hardware computer processors and one or more non-transitory computer readable storage device storing software instructions executable by the computing system to perform the computerized method comprising:
accessing an image captured by an image capture device of an augmented reality headset, the image including a pointer;
rendering, on a display of the augmented reality headset, an augmented image comprising the image and a representation of a virtual UI device;
applying, to the augmented image, a neural network trained using:
an augmented training image associated with the virtual UI device, the augmented training image comprising a representation of the virtual UI device and a representation of a real-world pointer, and
a UI event with respect to the virtual UI device and the real-world pointer in the augmented training image;
detecting, based on application of the neural network, the UI event with respect to the pointer in the image and the virtual UI device associated with the image;
generating virtual content based on the UI event; and
causing the display to present the virtual content.

* * * * *